(12) United States Patent
Katayama et al.

(10) Patent No.: US 7,660,924 B2
(45) Date of Patent: Feb. 9, 2010

(54) SEMICONDUCTOR INTEGRATED CIRCUIT DEVICE WHICH EXECUTES DATA TRANSFER BETWEEN A PLURALITY OF DEVICES CONNECTED OVER NETWORK, AND DATA TRANSFER METHOD

(75) Inventors: Yasuhiro Katayama, Kawasaki (JP); Harutaka Goto, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/352,348

(22) Filed: Jan. 12, 2009

(65) Prior Publication Data
US 2009/0138634 A1  May 28, 2009

Related U.S. Application Data

(62) Division of application No. 11/192,018, filed on Jul. 29, 2005, now abandoned.

(30) Foreign Application Priority Data
May 9, 2005  (JP) ............... 2005-136150

(51) Int. Cl.
*G06F 13/00* (2006.01)
*G06F 13/42* (2006.01)
*G06F 3/00* (2006.01)
(52) U.S. Cl. .................. 710/106; 710/52; 710/107
(58) Field of Classification Search ............. 710/22, 710/28, 52, 106–107, 113–114, 305, 310
See application file for complete search history.

(56) References Cited

U.S. PATENT DOCUMENTS 5,787,084 A * 7/1998 Hoang et al. ............. 370/390

(Continued)

FOREIGN PATENT DOCUMENTS

JP  10-116244  5/1998

(Continued)

OTHER PUBLICATIONS

Translation of Japanese Patent Document No. 2001-209626 as provided by Advanced Industrial Property Network of The Japan Patent Office. <http://dossier.ipdl.inpit.go.jp/text_trans.html>. Translated Dec. 20, 2007 (JST). pp. 1-14.

(Continued)

*Primary Examiner*—Thomas J Cleary
(74) *Attorney, Agent, or Firm*—Oblon, Spivak, McClelland, Maier & Neustadt, L.L.P.

(57) ABSTRACT

A semiconductor integrated circuit device includes a first semiconductor device and a second semiconductor device, first and second buffer circuits, a data bus, and a control circuit. The semiconductor integrated circuit device executes data transmission/reception between the first and second semiconductor devices. The first and second buffer circuits store data. The data bus transmits the data between the first and second buffer circuits. The first semiconductor device reads out the transfer data into the first buffer circuit. The control circuit transfers the transfer data, which is stored in the first buffer circuit, to the second buffer circuit via the data bus. The control circuit acquires a right of use of the data bus after the first semiconductor device writes the transfer data into the first buffer circuit, and disclaims the right of use of the data bus after the transfer data is transferred to the second buffer circuit.

4 Claims, 26 Drawing Sheets

U.S. PATENT DOCUMENTS

| | | | |
|---|---|---|---|
| 5,794,073 A * | 8/1998 | Ramakrishnan et al. | 710/40 |
| 6,757,763 B1 * | 6/2004 | Preiss et al. | 710/105 |
| 6,912,651 B1 | 6/2005 | Hamdi et al. | |
| 6,976,114 B1 | 12/2005 | Ware | |
| 2002/0065984 A1 | 5/2002 | Thompson et al. | |
| 2002/0067744 A1 * | 6/2002 | Fujii et al. | 370/535 |
| 2002/0184422 A1 * | 12/2002 | Regis | 710/240 |
| 2005/0027901 A1 * | 2/2005 | Simon et al. | 710/22 |
| 2006/0129722 A1 * | 6/2006 | Campbell | 710/106 |

FOREIGN PATENT DOCUMENTS

| | | |
|---|---|---|
| JP | 2001-209626 | 8/2001 |

OTHER PUBLICATIONS

Translation of Japanese Patent Document No. 10-116244 as provided by Advanced Industrial Property Network of The Japan Patent Office. <http://dossier.ipdl.inpit.go.jp/text_trans.html>. Translated Dec. 20, 2007 (JST). pp. 1-27.

'Dynamic Random Access Memory' in "The Free On-Line Dictionary of Computing". Online Jul. 11, 1996. Retrieved from Internet Dec. 19, 2007. <http://foldoc.org/?query=dram>.

'ACK' in "The Free On-Line Dictionary of Computing". Online Jan. 7, 1997. Retrieved from Internet Dec. 19, 2007. <http://foldoc.org/?query=ack>.

* cited by examiner

| Request | SDB | DDB |
|---------|-----|-----|
| A→B | 0 | 0 |
| C→D | 1 | 1 |
| B→C | 0 | 1 |
| ⋮ | ⋮ | ⋮ |

Request table

| Device A | | | | | | | |
|---|---|---|---|---|---|---|---|
| SDB | | | | DDB | | | |
| Entry No | Request | SrcAddr | DstAddr | Entry No | Request | SrcAddr | DstAddr |
| 0 | | | | 0 | | | |
| 1 | | | | 1 | | | |
| 2 | | | | 2 | | | |
| 3 | | | | 3 | | | |
| ⋮ | ⋮ | ⋮ | ⋮ | ⋮ | ⋮ | ⋮ | ⋮ |
| m | | | | k | | | |

Request table

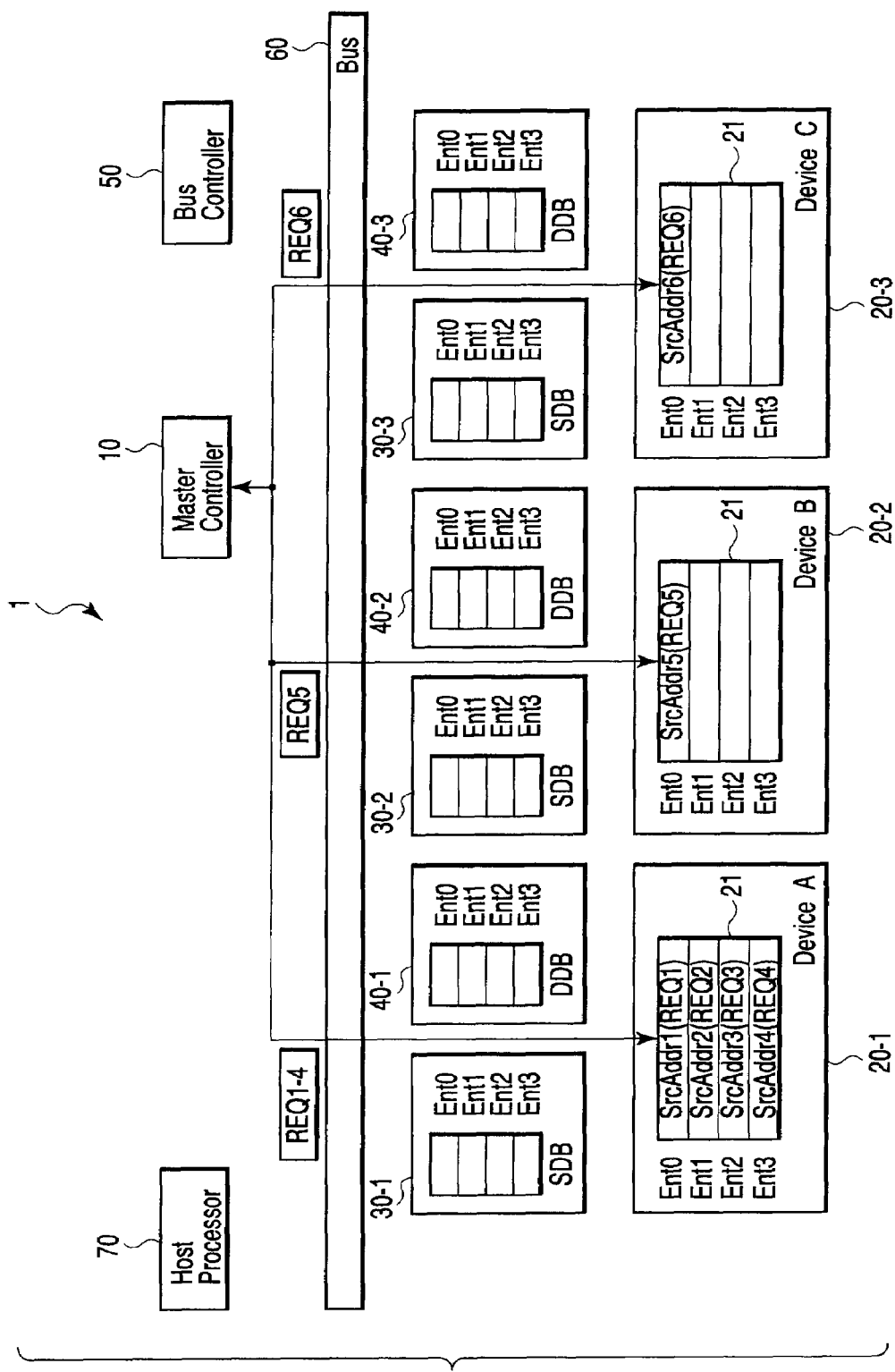
F I G. 20

Device A

| SDB | | | DDB | | |
|---|---|---|---|---|---|
| Entry No | Request | Addr | Entry No | Request | Addr |
| 0 | REQ2 | | 0 | | |
| 1 | | | 1 | | |
| 2 | | | 2 | | |
| 3 | | | 3 | | |

Device B

| SDB | | | DDB | | |
|---|---|---|---|---|---|
| Entry No | Request | Addr | Entry No | Request | Addr |
| 0 | REQ5 | | 0 | | |
| 1 | | | 1 | | |
| 2 | | | 2 | | |
| 3 | | | 3 | | |

Device C

| SDB | | | DDB | | |
|---|---|---|---|---|---|
| Entry No | Request | Addr | Entry No | Request | Addr |
| 0 | REQ6 | | 0 | | |
| 1 | | | 1 | | |
| 2 | | | 2 | | |
| 3 | | | 3 | | |

Request table

F I G. 22

Device A

| SDB | | | DDB | | |
|---|---|---|---|---|---|
| Entry No | Request | Addr | Entry No | Request | Addr |
| 0 | REQ2 | | 0 | REQ5 | |
| 1 | REQ1 | | 1 | | |
| 2 | | | 2 | | |
| 3 | | | 3 | | |

Device B

| SDB | | | DDB | | |
|---|---|---|---|---|---|
| Entry No | Request | Addr | Entry No | Request | Addr |
| 0 | | | 0 | | |
| 1 | | | 1 | | |
| 2 | | | 2 | | |
| 3 | | | 3 | | |

Device C

| SDB | | | DDB | | |
|---|---|---|---|---|---|
| Entry No | Request | Addr | Entry No | Request | Addr |
| 0 | REQ6 | | 0 | | |
| 1 | | | 1 | | |
| 2 | | | 2 | | |
| 3 | | | 3 | | |

Request table

FIG. 24

Device A

| | SDB | | | DDB | |
|---|---|---|---|---|---|
| Entry No | Request | Addr | Entry No | Request | Addr |
| 0 | REQ2 | | 0 | REQ5 | |
| 1 | REQ1 | | 1 | REQ6 | |
| 2 | REQ4 | | 2 | | |
| 3 | | | 3 | | |

Device B

| | SDB | | | DDB | |
|---|---|---|---|---|---|
| Entry No | Request | Addr | Entry No | Request | Addr |
| 0 | | | 0 | | |
| 1 | | | 1 | | |
| 2 | | | 2 | | |
| 3 | | | 3 | | |

Device C

| | SDB | | | DDB | |
|---|---|---|---|---|---|
| Entry No | Request | Addr | Entry No | Request | Addr |
| 0 | | | 0 | | |
| 1 | | | 1 | | |
| 2 | | | 2 | | |
| 3 | | | 3 | | |

Request table

FIG. 26

Device A

| SDB | | | DDB | | |
|---|---|---|---|---|---|
| Entry No | Request | Addr | Entry No | Request | Addr |
| 0 | REQ2 | | 0 | REQ5 | |
| 1 | REQ1 | | 1 | REQ6 | |
| 2 | | | 2 | | |
| 3 | REQ3 | | 3 | | |

Device B

| SDB | | | DDB | | |
|---|---|---|---|---|---|
| Entry No | Request | Addr | Entry No | Request | Addr |
| 0 | | | 0 | | |
| 1 | | | 1 | | |
| 2 | | | 2 | | |
| 3 | | | 3 | | |

Device C

| SDB | | | DDB | | |
|---|---|---|---|---|---|
| Entry No | Request | Addr | Entry No | Request | Addr |
| 0 | | | 0 | REQ4 | |
| 1 | | | 1 | | |
| 2 | | | 2 | | |
| 3 | | | 3 | | |

Request table

FIG. 28

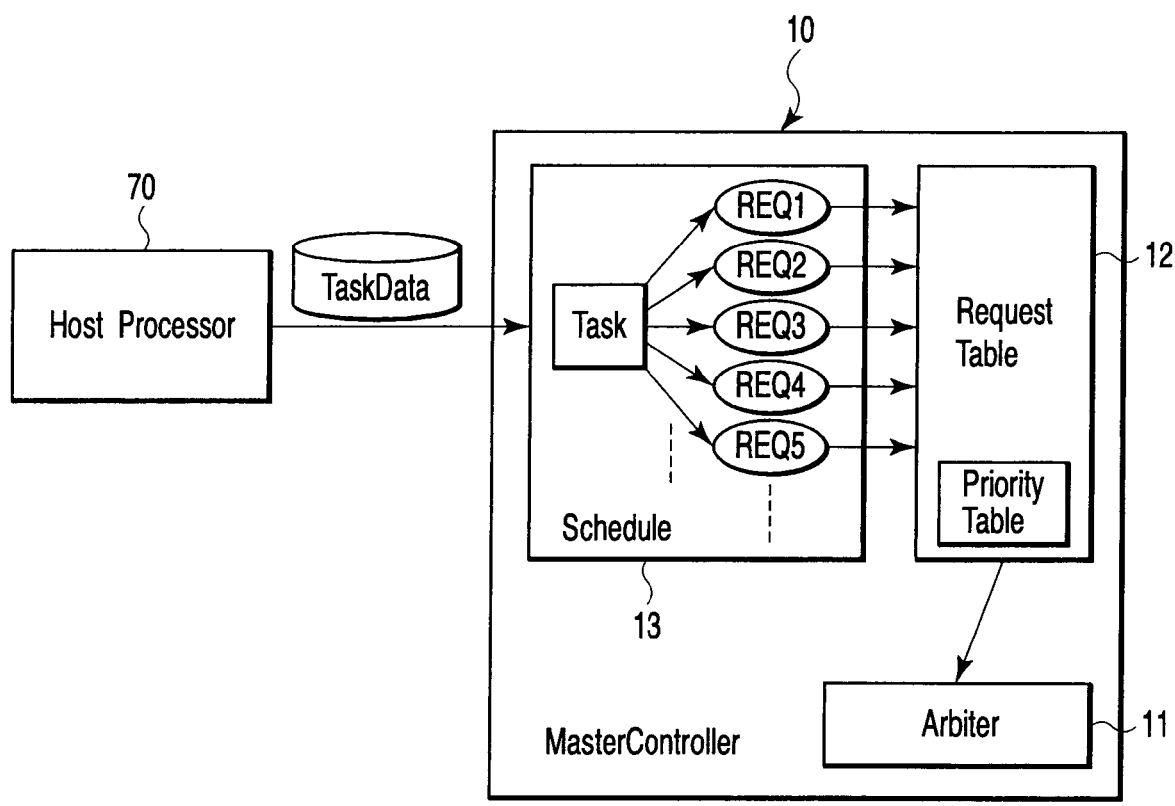
F I G. 30

SEMICONDUCTOR INTEGRATED CIRCUIT DEVICE WHICH EXECUTES DATA TRANSFER BETWEEN A PLURALITY OF DEVICES CONNECTED OVER NETWORK, AND DATA TRANSFER METHOD

CROSS-REFERENCE TO RELATED APPLICATIONS

This application is a divisional of U.S. application Ser. No. 11/192,018 filed Jul. 29, 2005, and is based upon and claims the benefit of priority from prior Japanese Patent Application No. 2005-136150, filed May 9, 2005, the entire contents of each of which are incorporated herein by reference.

BACKGROUND OF THE INVENTION

1. Field of the Invention

The present invention relates generally to a semiconductor integrated circuit device and a data transfer method, and relates to, for instance, a data transfer scheme of data transfer between a plurality of devices connected over a network.

2. Description of the Related Art

In recent years, the amount of data handled in computers has been increasing with great rapidity. Accordingly, how to increase a data transfer speed is very important from the standpoint of enhancement in processing speed of computers.

In the prior art, Jpn. Pat. Appln. KOKAI Publication No. 2001-209626 and Jpn. Pat. Appln. KOKAI Publication No. H10-116244, for instance, disclose various data transfer techniques such as DMA transfer. In these prior-art data transfer methods, however, the data transfer speed is not sufficient.

BRIEF SUMMARY OF THE INVENTION

A semiconductor integrated circuit device, which includes a first semiconductor device and a second semiconductor device and executes data transmission/reception between the first and second semiconductor devices, according to an aspect of the present invention includes:

first and second buffer circuits which store data;

a data bus which transmits the data between the first and second buffer circuits;

the first semiconductor device which reads out the transfer data into the first buffer circuit in a case where the first buffer circuit includes an empty area at a time of transferring the data;

a control circuit which transfers the transfer data, which is stored in the first buffer circuit, to the second buffer circuit via the data bus in a case where the second buffer circuit includes an empty area at the time of transferring the data, the control circuit acquiring a right of use of the data bus after the first semiconductor device writes the transfer data into the first buffer circuit, and disclaiming the right of use of the data bus after the transfer data is transferred to the second buffer circuit; and the second semiconductor device which reads out the transfer data transferred to the second buffer circuit.

A data transfer method for data transfer between a first semiconductor device and a second semiconductor device, which are connected over a data bus, according to an aspect of the present invention includes:

causing the first semiconductor device, which functions as a transfer-source semiconductor device, to read out transfer data into a first buffer circuit;

causing a control circuit to confirm completion of the read-out of the transfer data into the first buffer circuit, and to acquire a right of use of the data bus;

causing the control circuit to transfer the transfer data, which is stored in the first buffer circuit, to a second buffer circuit via the data bus;

causing the control circuit to disclaim the right of use of the data bus after the transfer of the transfer data;

causing the second semiconductor device to read out the transfer data transferred to the second buffer circuit.

BRIEF DESCRIPTION OF THE SEVERAL VIEWS OF THE DRAWING

FIG. 20 is a block diagram of the semiconductor integrated circuit device according to the fourth embodiment of the invention;

FIG. 22 is a conceptual view of a request table that is provided in the master controller according to the fourth embodiment of the invention;

FIG. 24 is a conceptual view of the request table that is provided in the master controller according to the fourth embodiment of the invention;

FIG. 26 is a conceptual view of the request table that is provided in the master controller according to the fourth embodiment of the invention;

FIG. 28 is a conceptual view of the request table that is provided in the master controller according to the fourth embodiment of the invention;

FIG. 30 is a block diagram of a host processor and a master controller that are provided in a semiconductor integrated circuit device according to a first modification of the first to fifth embodiments of the invention;

DETAILED DESCRIPTION OF THE INVENTION

Figures 1, 2:
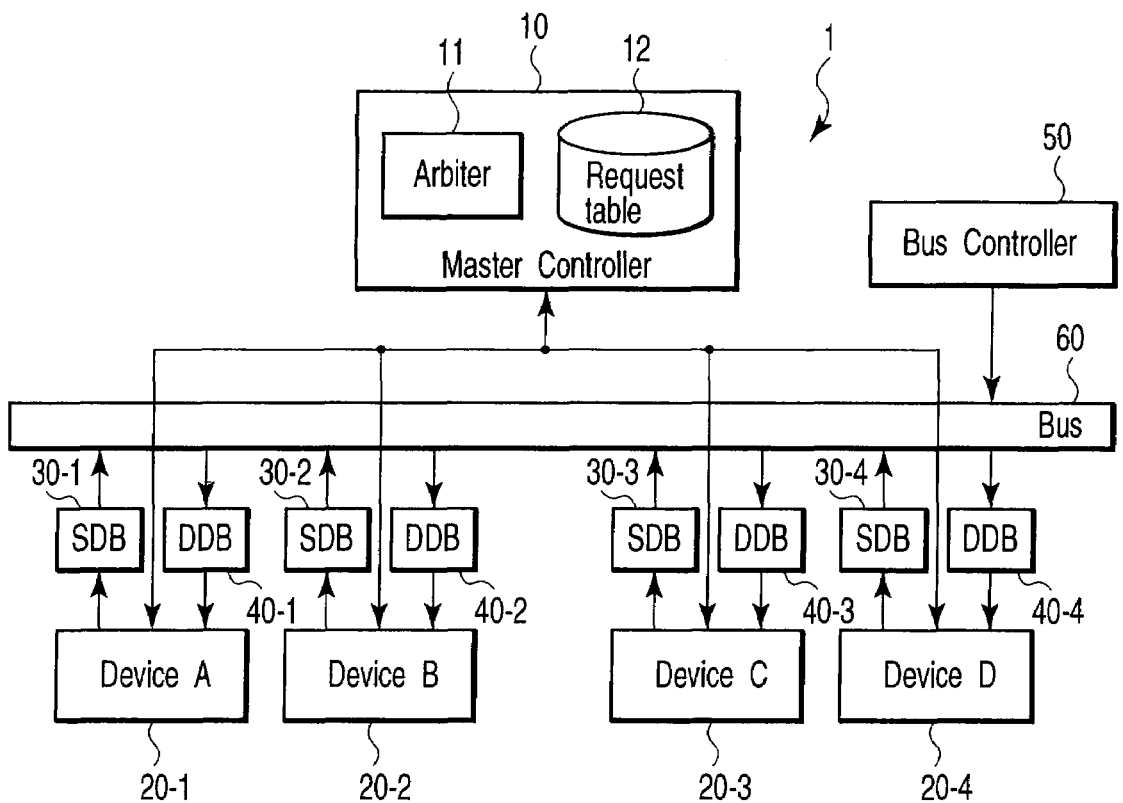
FIG. 1 is a block diagram of a semiconductor integrated circuit device according to a first embodiment of the present invention.
FIG. 2 is a conceptual view of a request table that is provided in a master controller according to the first embodiment of the invention.

A semiconductor integrated circuit device and a data transfer method according to a first embodiment of the present invention will now be described with reference to FIG. 1. FIG. 1 is a block diagram of a semiconductor integrated circuit (LSI) according to this embodiment. As is shown in FIG. 1, an LSI 1 comprises a master controller (hereinafter abbreviated as "MC") 10, four semiconductor devices 20-1 to 20-4 (hereinafter referred to as "devices A to D"), source data buffers (SDB) 30-1 to 30-4, destination data buffers (DDB) 40-1 to 40-4, a bus controller 50, and a data bus 60.

The devices A to D are independent semiconductor devices, and each of the devices A to D includes a CPU, a memory and an input/output circuit. The devices A to D execute mutual data transmission/reception via a data bus 60. It should suffice if each of the devices A to D has a data transfer function, and the structure of devices A to D is not limited to the above-described one.

The SDBs 30-1 to 30-4 are provided in association with the devices A to D. At a time of data transfer, the SDBs 30-1 to 30-4 temporarily store data to be transferred, when the devices A to D serve as data transfer sources. In the present embodiment, each of the SDBs 30-1 to 30-4 has only one entry and can store only data for a single transfer operation.

The DDBs 40-1 to 40-4 are provided in association with the devices A to D. At a time of data transfer, the DDBs 40-1 to 40-4 temporarily store transferred data, when the devices A to D serve as data transfer destinations. In the present embodiment, each of the DDBs 40-1 to 40-4 has only one entry and can store only data for a single transfer operation.

The MC 10 controls data transfer between the devices A to D. The MC 10 includes an arbiter 11 and a request table 12. The arbiter 11 instructs the devices A to D to actually transfer data. The request table 12 is explained with reference to FIG. 2. FIG. 2 is a conceptual view showing an example of the request table 12.

As is shown in FIG. 2, the request table 12 contains, as information, a currently outstanding transfer request, a state of the SDB of a transfer-source device associated with the transfer request, and a state of the DDB of a transfer destination device associated with the transfer request. In the case of FIG. 2, a transfer request from the device A to the device B is outstanding. The SDB 30-1 of device A and the DDB 40-2 of device B are in an empty state ("0"). In addition, there is a transfer request from the device C to the device D. The SDB 30-3 of device C and the DDB 40-4 of device D store some data and are in a non-empty state ("1"). Further, a transfer request from the device B to the device C is outstanding, and the SDB 30-2 of device B is in the empty state and the DDB 40-3 of device C is in the non-empty state. The arbiter 11 refers to the request table and determines which transfer request is to be executed.

When data transfer between devices is executed, the bus controller 50 connects the devices over the bus 60 in response to an instruction from the MC 10 so that the devices may become mutually communicable.

Figure 3:
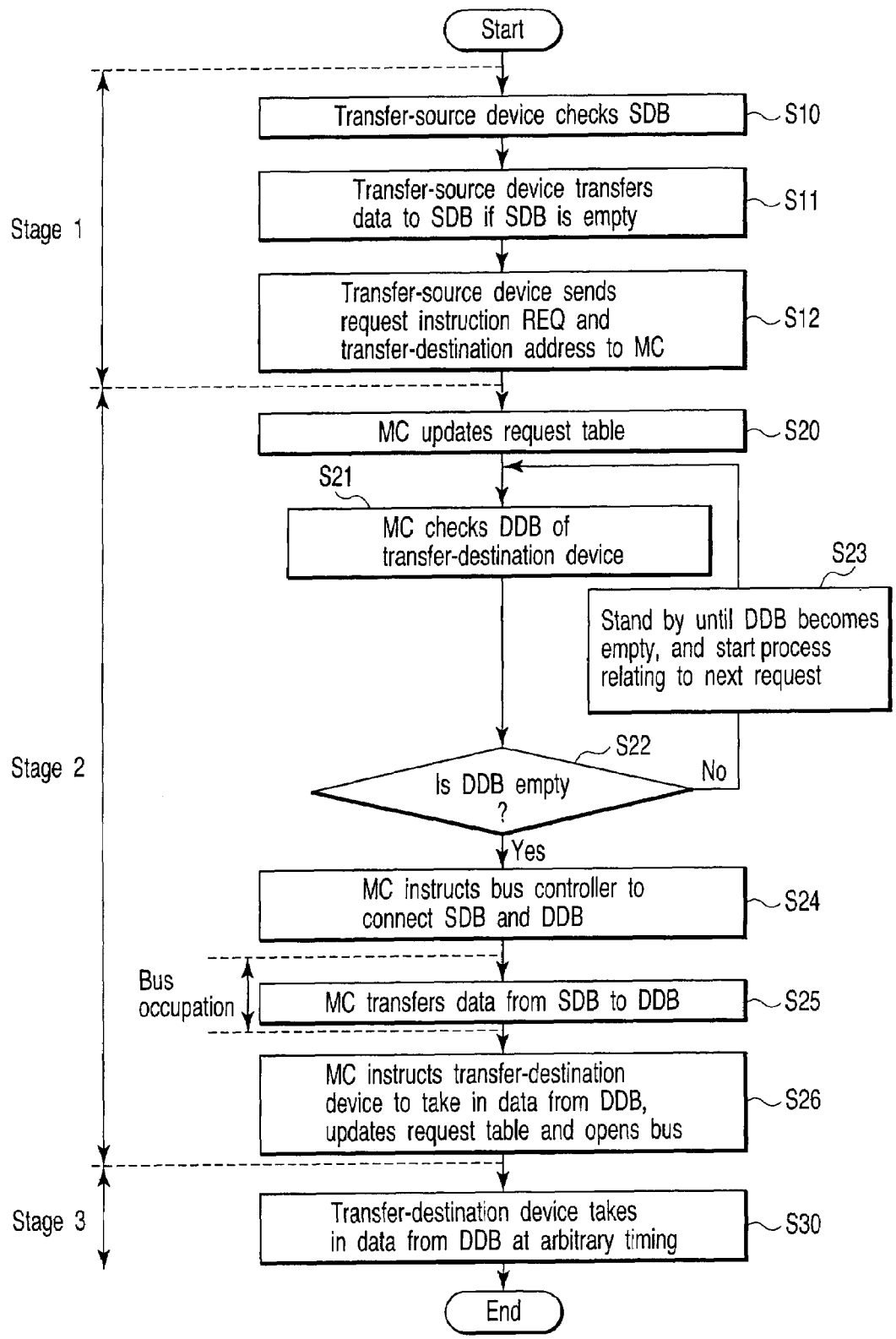
FIG. 3 is a flow chart of a data transfer method that is executed by the semiconductor integrated circuit device according to the first embodiment of the invention.

Next, referring to FIG. 3, a data transfer method, which is executed by the LSI 1 according to the present embodiment, is described. FIG. 3 is a flow chart illustrating the data transfer method according to this embodiment. The data transfer method generally comprises three stages 1 to 3. The stage 1 relates to a process in the transfer-source device, the stage 2 relates to a process in the MC 10, and the stage 3 relates to a process in the transfer destination device. For example, data transfer from the device A to the device B is described.

Figures 4, 5:
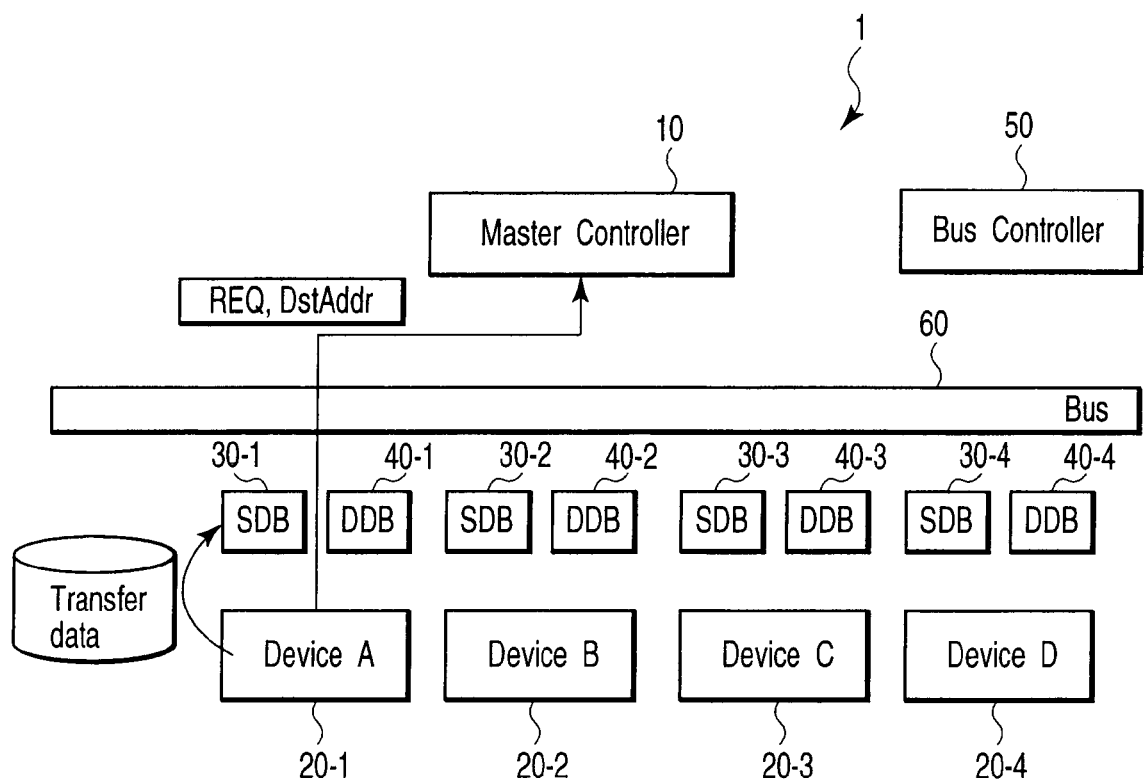
FIG. 4 is a block diagram of the semiconductor integrated circuit device according to the first embodiment of the invention.
FIG. 5 is a conceptual view of a request table that is provided in the master controller according to the first embodiment of the invention.

To start with, the device A which is the transfer-source device checks whether the SDB 30-1 is empty or not (step S10). Data transfer is executed while a SDB is in an empty state. Thus, if the SDB is not empty, the data transfer stands by until the SDB becomes empty. If the SDB 30-1 is empty, the device A writes data, which is to be transferred, in the SDB 30-1 (step S11). When data write in the SDB 30-1 is completed, the device A sends a request instruction REQ and a transfer destination address to the MC 10 (step S12). The request instruction REQ is a request signal to the effect that the data in the SDB 30-1 should be transferred to the device B. The transfer destination address is an address DstAddr of a memory area in which the transfer data is to be written in the destination device B. FIG. 4 illustrates the process in steps S11 and S12. The three steps S10 to S12 are included in the stage 1. The device A is required to execute no subsequent process relating to the data transfer.

Then, the stage 2 begins. The MC 10 updates the request table 12 in response to the request instruction REQ (step S20). FIG. 5 shows the updated request table 12. As is shown in FIG. 5, the request table 12 includes the transfer request from the device A to the device B, and the empty/non-empty states of the SDB 30-1 of device A and the DDB 40-2 of device B. Assume now that the DDB 40-2 is empty.

Subsequently, the MC 10 checks whether the DDB 40-2 of the transfer-destination device B is empty or not (step S21). This is implemented by reference to the request table 12. In place of step S20, the DDB may be confirmed in this step S21 and the information relating to the DDB may be written in the request table 12. Data transfer is executed while the DDB is in the empty state. Thus, if the DDB 40-2 is in use (step S22), the MC 10 suspends the process until the DDB 40-2 becomes empty, and executes a different process if there is another request (step S23).

Figure 6:
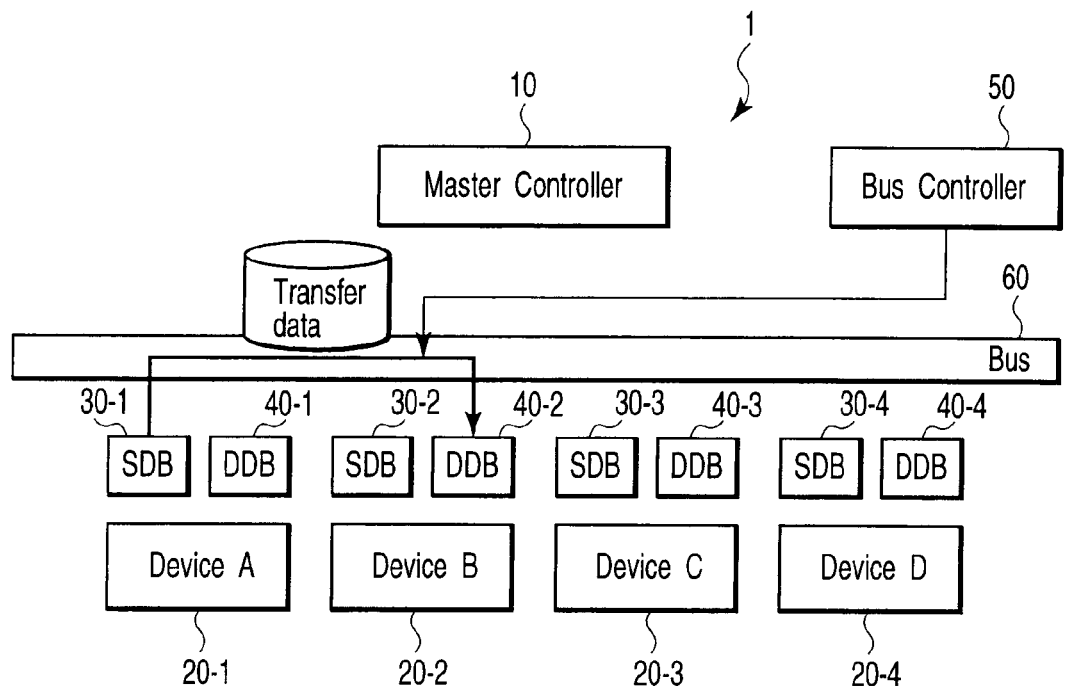
FIG. 6 is a block diagram of the semiconductor integrated circuit device according to the first embodiment of the invention.

If the DDB 40-2 is empty (step S22), data transfer from the device A to the device B is actually executed. Specifically, the MC 10 instructs the bus controller 50 to connect the device A and device B (step S24). Responding to the request, the bus controller 50 connects the SDB 30-1 and the DDB 40-2 so that they become mutually communicable. In other words, the devices A and B occupy the bus 60. The MC 10 transfers the data, which is stored in the SDB 30-1, to the DDB 40-2 over the bus 60 (step S25). FIG. 6 illustrates this process.

Upon completion of the data transfer, the bus controller 50 opens the bus 60 in accordance with an instruction from the MC 10. In addition, the MC 10 instructs the transfer-destination device B to take in the data from the DDB 40-2. In this case, the MC 10 informs the transfer-destination device B of the destination address DstAddr. Further, the MC 10 updates the request table 12 (step S26). Specifically, the MC 10 deletes the executed transfer request from the request table 12. These steps S20 to S26 are included in the stage 2. The MC 10 is required to execute no subsequent process relating to the data transfer.

Figure 7:
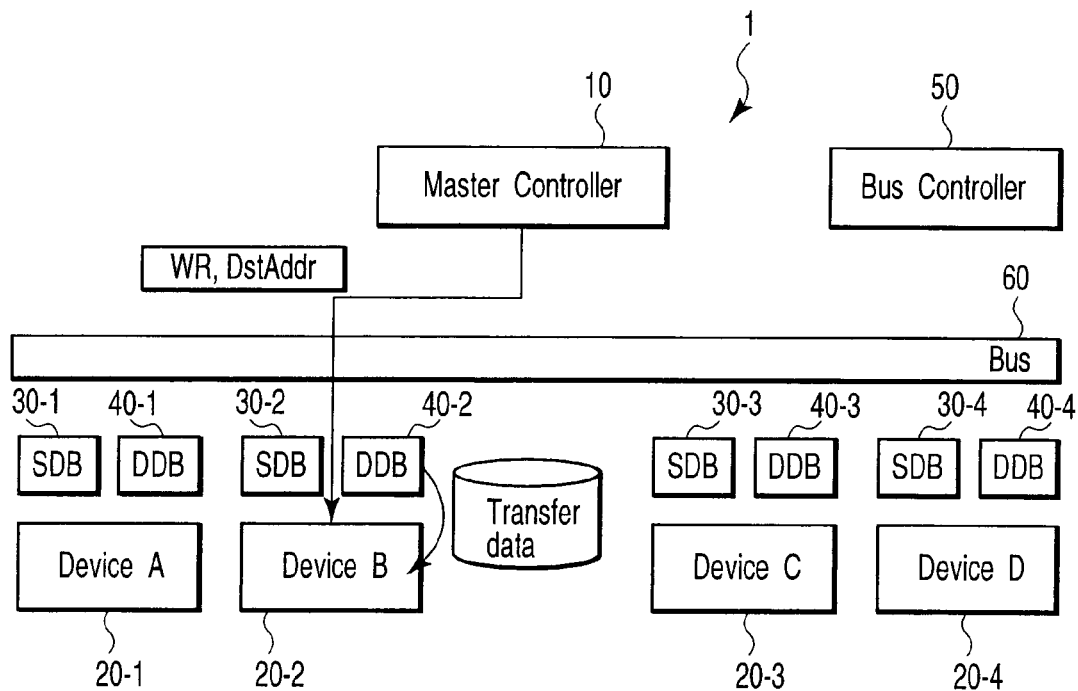
FIG. 7 is a block diagram of the semiconductor integrated circuit device according to the first embodiment of the invention.

The process then transits to the stage 3. In the stage 3, as shown in FIG. 7, the transfer-destination device B takes in the data from the DDB 40-2 at an arbitrary timing (step S30). The data is written in the memory area corresponding to the destination address DstAddr.

In this manner, the data transfer from the device A to the device B is completed. The same method applies to data transfer between other devices.

With the LSI according to the above-described embodiment, the following advantageous effects (1) to (3) are obtained.

(1) The Data Transfer Efficiency can be Improved (Part 1).

Conventional DMA transfer is generally executed by the following two steps by a DMA controller. (Step 1) To start with, data is read out of transfer-source device. Specifically, the DMA controller serves as a bus master, and acquires the right of use of the bus. The DMA controller issues a data read-out request to the transfer-source device. In response, the transfer-source device outputs an acknowledge signal, which acknowledges that requested data is to be sent, and the request data. Upon receiving the acknowledge signal as a trigger, the DMA controller receives the data from the transfer-source device. Then, the DMA controller disclaims the right of use of the bus. (Step 2) Next, data write to a transfer-destination device is executed. Specifically, the DMA controller reacquires the right of use of the bus. The DMA controller issues a data write request to the transfer-destination device. If the transfer-destination device completes preparation for receiving data, it outputs an acknowledge signal. Upon receiving the acknowledge signal as a trigger, the DMA controller outputs the data to the transfer-destination device. Then, the DMA controller disclaims the right of use of the bus.

In the above-described transfer method, the time period, during which the bus is occupied for a single data transfer operation, is a time period from the start to the end of a bus protocol. This time period is longer than the time which is needed for the actual data transfer. In the above steps 1 and 2, after the DMA controller acquires the right of use of the bus, the bus is continuously occupied until the right of use of the bus is disclaimed. In this case, the bus is occupied not only during a time period when data is actually transferred over the buts, but also the bus is uselessly occupied during a time period for transmission of necessary signals ("handshake") between the DMA controller and the transfer-source/destination devices for the data transfer. For example, assume that n-cycles are necessary for a single bus protocol, and m-cycles correspond to the time during which the bus is exactly used for the data transfer. In this case, the bus is uselessly occupied by (n-m) cycles. In particular, if the scale of the system is large and many devices execute data transfer over the same bus, the time for signal propagations increases and the time, during which the bus is uselessly occupied for handshake, becomes longer.

In the present embodiment, the SDB and DDB are provided for each of the devices. The transfer-source device may write transfer data in the SDB at an arbitrary timing, and the transfer-destination device may read out data from the DDB at an arbitrary timing. In addition, the MC may execute data transfer at any time if the DDB is in the empty state. Thus, the MC 10 can reduce the number of items to be determined in order to execute the data transfer, and the time necessary for handshake can remarkably be made shorter than in the prior art. Accordingly, the time of useless occupation of the bus by the handshake can be decreased, and the data transfer speed/efficiency can be enhanced.

Furthermore, in the present embodiment, the MC 10 acquires the right of use of the bus only in the stage 2 for the data transfer from the SDB to the DDB. It is thus possible to prevent the bus from being uselessly occupied in the stages 1 and 2.

(2) The Data Transfer Efficiency can be Improved (Part 2).

The data transfer method according to the present embodiment comprises the three stages, and the respective stages are executed by the transfer-source device, MC 10 and transfer-destination device. Thus, these stages can be implemented by a pipeline operation. This point is described referring to FIG. 8.

Figure 8:
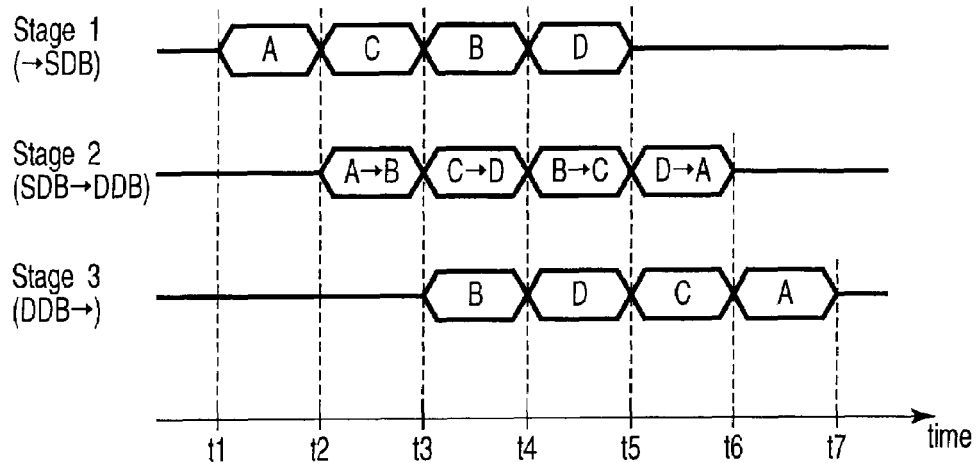
FIG. 8 is a timing chart that illustrates a scheme of data transfer by the semiconductor integrated circuit device according to the first embodiment of the invention.

FIG. 8 is a timing chart illustrating the operation states of the stages 1 to 3. For the purpose of simplicity, it is supposed that the time necessary for each stage is equal, and the transfer-destination DDB is empty when the transfer request is made.

Assume now that data transfer requests have been issued successively from the devices A to C, as shown in FIG. 8. At time instant t1, the device A transfers data to the SDB 30-1 and outputs a request instruction REQ for data transfer to the device B (stage 1). At time instant t2, the MC 10 acquires the right of use of the bus, and transfers the data from the SDB 30-1 to the DDB 40-2 of device B (stage 2). Then, the MC 10 disclaims the right of use of the bus. At time instant t3, after the completion of the data transfer, the device B reads out the transfer data from the DDB 40-2 (stage 3).

On the other hand, at time instant t2, the device C transfers data to the SDB 30-3 and outputs a request instruction REQ for data transfer to the device D (stage 1). At time instant t3, the right of use of the bus, which is based on the transfer request by the device A, is already disclaimed. Thus, at time instant t3, the MC 10 reacquires the right of use of the bus, and transfers the data from the SDB 30-3 to the DDB 40-4 of device D (stage 2). Then, the MC 10 disclaims the right of use of the bus. At time instant t4, after the completion of the data transfer, the device D reads out the transfer data from the DDB 40-4 (stage 3). In short, the process of the stage 2, which is based on the transfer request by the device A, overlaps in time with the process of the stage 1, which is based on the transfer request by the device C.

Further, at time instant t3, the device B transfers data to the SDB 30-2 and outputs a request instruction REQ for data transfer to the device C (stage 1). At time instant t4, the right of use of the bus, which is based on the transfer request by the device C, is already disclaimed. Thus, at time instant t4, the MC 10 reacquires the right of use of the bus, and transfers the data from the SDB 30-2 to the DDB 40-3 of device C (stage 2). Then, the MC 10 disclaims the right of use of the bus. At time instant t5, after the completion of the data transfer, the device C reads out the transfer data from the DDB 40-3 (stage 3). In short, the process of the stage 3, which is based on the transfer request by the device A, overlaps in time with the process of the stage 2, which is based on the transfer request by the device C, and with the process of the stage 1, which is based on the transfer request by the device B.

Subsequently, at time instant t4, the device D transfers data to the SDB 30-4 and outputs a request instruction REQ for data transfer to the device A (stage 1). At time instant t5, the right of use of the bus, which is based on the transfer request by the device B, is already disclaimed. Thus, at time instant t5, the MC 10 reacquires the right of use of the bus, and transfers the data from the SDB 30-4 to the DDB 40-1 of device A (stage 2). Then, the MC 10 disclaims the right of use of the bus. At time instant t6, after the completion of the data transfer, the device A reads out the transfer data from the DDB 40-1 (stage 3). In short, the process of the stage 3, which is based on the transfer request by the device C, overlaps in time with the process of the stage 2, which is based on the transfer request by the device B, and with the process of the stage 1, which is based on the transfer request by the device D. Moreover, the process of the stage 3, which is based on the transfer request by the device B, overlaps in time with the process of the stage 2, which is based on the transfer request by the device D.

Figure 9:
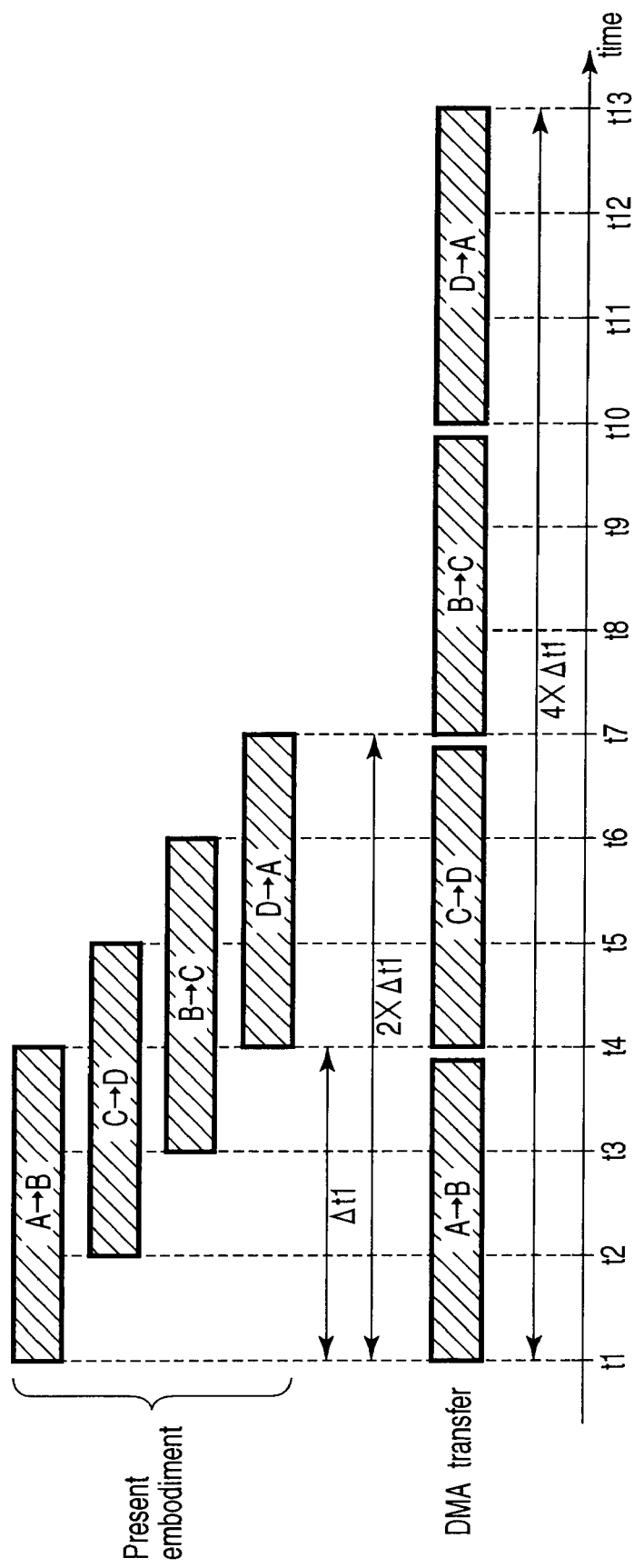
FIG. 9 is a timing chart that illustrates a scheme of data transfer and DMA transfer by the semiconductor integrated circuit device according to the first embodiment of the invention.

As has been described above, the processes in the respective stages can be executed in a pipeline fashion. As a result, the data transfer efficiency can be enhanced. This point is explained with reference to FIG. 9. FIG. 9 is a timing chart illustrating the state of processing in the stages 1 to 3 of the data transfer method according to the present embodiment, and the state of processing in the conventional DMA transfer. In FIG. 9, for the purpose of simplicity, it is assumed that the same time period ($\Delta t1$) is needed for data transfer in the present embodiment and the conventional DMA transfer. Actually, needless to say, as has been described in connection with the advantageous effect (1), the time needed for handshake can be decreased in the present embodiment, and thus the data transfer time can be made shorter than in the conventional DMA transfer.

As is shown in FIG. 9, in the conventional DMA transfer, the DMAC temporarily retains transfer data, and the bus is continuously occupied from the start to the end of the bus protocol. Consequently, it is difficult to execute a plurality of transfer processes in a parallel fashion. As shown in FIG. 9, a total time of ($4 \times \Delta t1$) is needed.

By contrast, in the transfer method of this embodiment, the MC 10 does not retain transfer data, and executes direct data transfer between the SDB and DDB. The four transfer processes of device A→device B, device C→device D, device B→device C, and device D→device A are partly overlapped so that the stages 2 of the respective processes may successively be performed. Thus, the time needed to complete all transfer processes is ($2 \times \Delta t1$), which is half the time in the prior art.

(3) The Data Transfer Efficiency can be Improved (Part 3).

In the data transfer method according to the present embodiment, the stage 1 is executed for the device whose SDB is empty. The stage 1 is the process executed in each of the devices, regardless of the state of other devices. It is thus possible that a plurality of devices transfer data to the associated SDBs and output request instructions REQ to the MC 10 in the same time zone. If the MC 10 receives a plurality of request instructions, the MC 10 preferentially executes a request instruction associated with an empty-state DDB of the transfer-destination device. In short, the data transfer is executed in an "out-of-order" fashion. Therefore, the data transfer efficiency can be improved.

Figure 10:
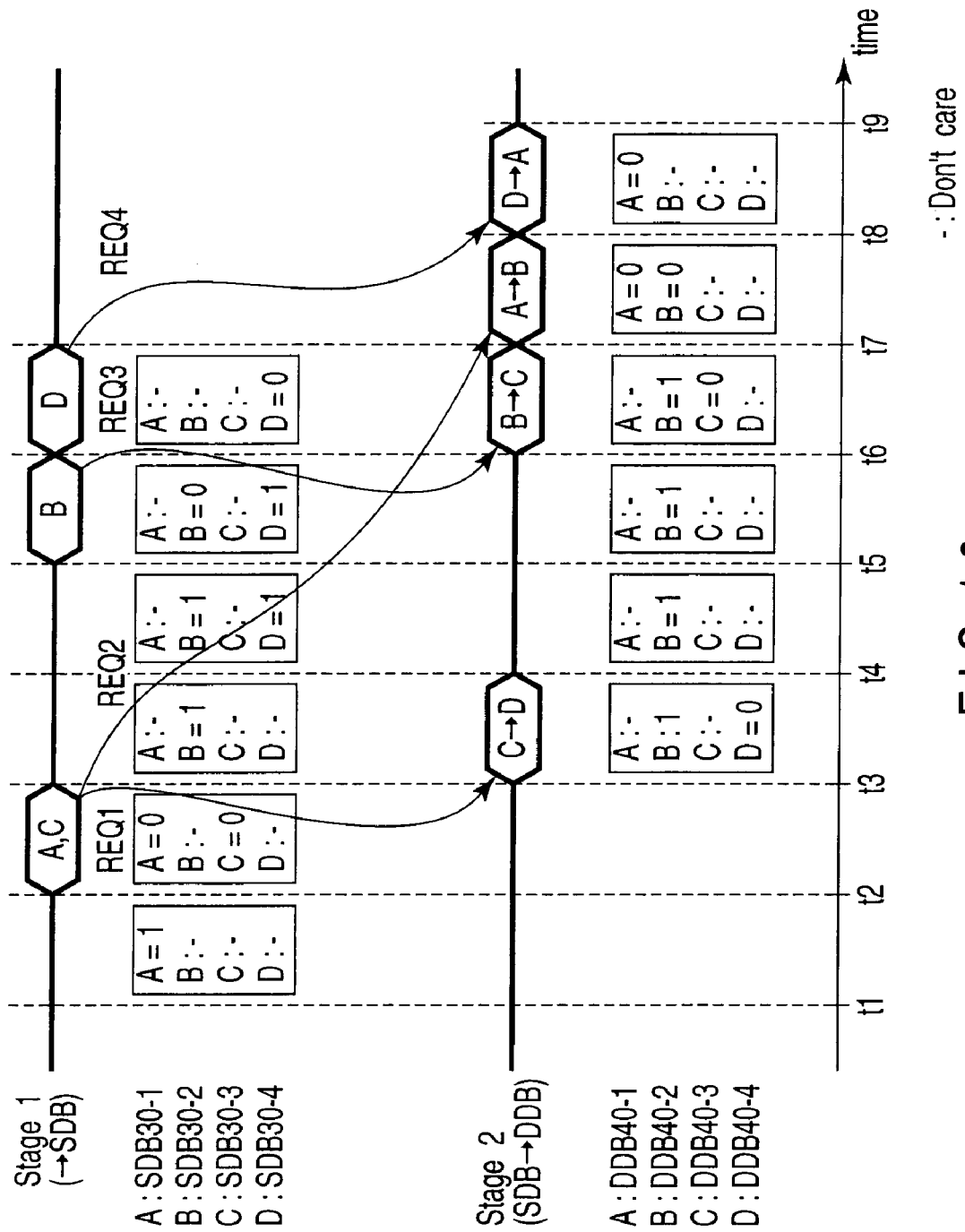
FIG. 10 is a timing chart that illustrates a scheme of data transfer by the semiconductor integrated circuit device according to the first embodiment of the invention.

This process is described with reference to FIG. 10. FIG. 10 is a timing chart illustrating the states of operations of the stages 1 to 3 and the states of the SDBs and DDBs of the devices. Assume now that the devices A to D have determined data transfer at time instants t1 to t4, as in the case of FIG. 9.

To start with, at time instant t1, the device A determines data transfer to the device B. At time instant t1, however, the SDB 30-1 is in use, so the device A postpones the data transfer.

At time instant t2, the device C determines data transfer to the device D. At time instant t2, the SDB 30-3 is empty, so the device C transfers data to the SDB 30-3 and outputs a request instruction REQ1 to the MC 10. In addition, since the SDB 30-1 has become empty at time instant t2, the device A transfers data to the SDB 30-1 and outputs a request instruction REQ2 to the MC 10.

At time instant t3, the device B determines data transfer to the device C. At time instant t3, however, the SDB 30-2 is in use, so the device B postpones the data transfer. In addition, since the DDB 40-2 is in use and the DDB 40-4 is empty, the MC 10 keeps the request instruction REQ2 outstanding, and executes the data transfer relating to the request instruction REQ1. Specifically, the MC 10 transfers the data from the SDB 30-3 to the DDB 40-4.

At time instant t4, the device D determines data transfer to the device A. At time instant t4, however, the SDB 30-4 is in use, so the device D postpones the data transfer. In addition, since the SDB 30-2 is still in use, the device B further postpones the data transfer. Besides, since the DDB 40-2 is still in use, the MC 10 further keeps the request instruction REQ2 outstanding.

At time instant t5, the SDB 30-2 becomes empty, so the device B transfers data to the SDB 30-2 and outputs a request instruction REQ3 to the MC 10. Since the DDB 40-2 is still in use, the MC 10 further keeps the request instruction REQ2 outstanding.

At time instant t6, the SDB 30-4 becomes empty, so the device D transfers data to the SDB 30-4 and outputs a request instruction REQ4 to the MC 10. Although the DDB 40-2 is still in use, the DDB 40-3 is now empty. Thus, the MC 10 executes the request instruction REQ3, prior to the request instruction REQ2.

At time instant t7, the DDB 40-2 becomes empty, so the MC 10 executes the request instruction REQ2. At time instant t8, the MC 10 executes the request instruction REQ4.

As has been described above, the MC 10 executes request instructions, not in the order of reception of request instructions, but in the order beginning with a request instruction associated with executable data transfer. Thus, unless waiting period is not required and the data transfer efficiency can be improved.

(4) The Processing Efficiency of Each Device can be Improved.

In the data transfer method according to the present embodiment, the SDB and DDB are provided for each device. Thus, once the transfer-source device has written data in the associated SDB, it completes the process for data transfer and transfer-destination device is not required to execute any further process until the data is read out of the DDB. In other words, the transfer-source device is released from the data transfer process in the stages 2 and 3, and can execute its own independent process. Moreover, in the stages 1 and 2, the transfer-destination device is not required to execute the data transfer process and can execute its own independent process during the time period of stages 1 and 2. Therefore, it is possible to prevent the devices from being unnecessarily occupied by the data transfer process, and the processing efficiency of each device can be enhanced.

Figure 11:
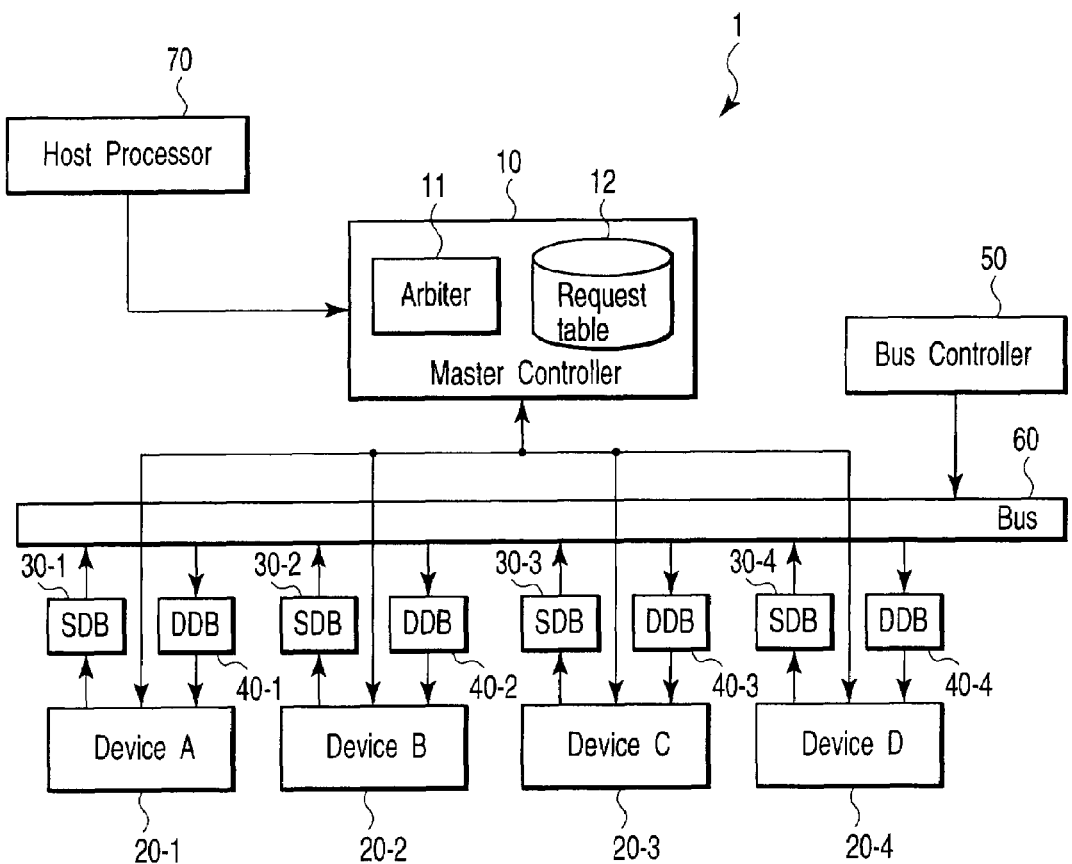
FIG. 11 is a block diagram of a semiconductor integrated circuit device according to a second embodiment of the present invention.

Next, a semiconductor integrated circuit device and a data transfer method according to a second embodiment of the present invention are described with reference to FIG. 11. FIG. 11 is a block diagram of an LSI according to this embodiment. The present embodiment relates to a case in which the MC 10 receives a request instruction from a block other than the devices A to D.

As is shown in FIG. 11, the LSI 1 of this embodiment further comprises a host processor 70 in addition to the structure shown in FIG. 1, which has been described in connection with the first embodiment. The host processor 70 issues a request for data transfer between devices A to D to the MC 10, and outputs a request instruction to the MC 10.

Figure 12:
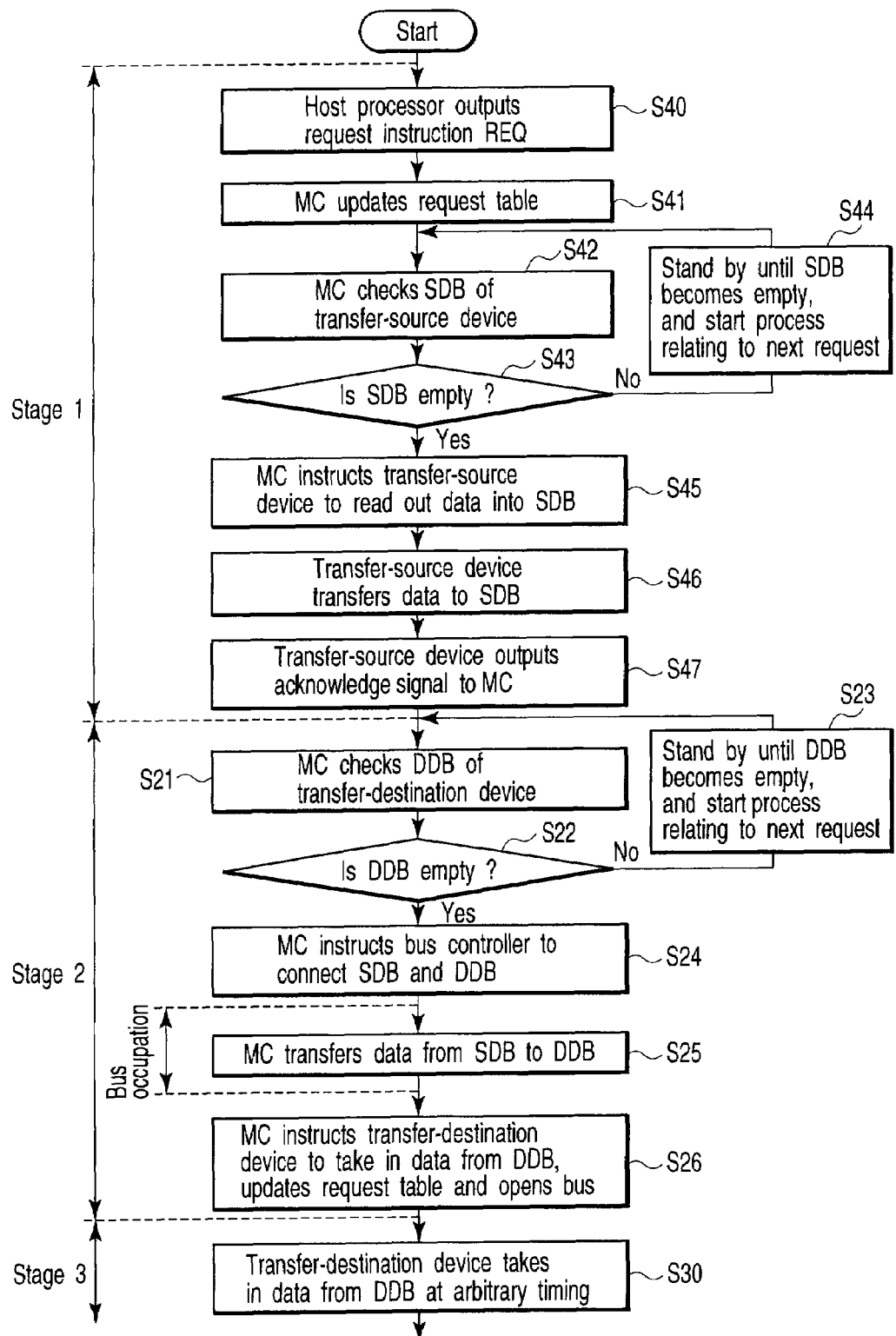
FIG. 12 is a flow chart of a data transfer method that is executed by the semiconductor integrated circuit device according to the second embodiment of the invention.

A data transfer method executed by the LSI 1 of this embodiment is described with reference to FIG. 12. FIG. 12 is a flow chart illustrating the data transfer method according to this embodiment.

Figure 13:
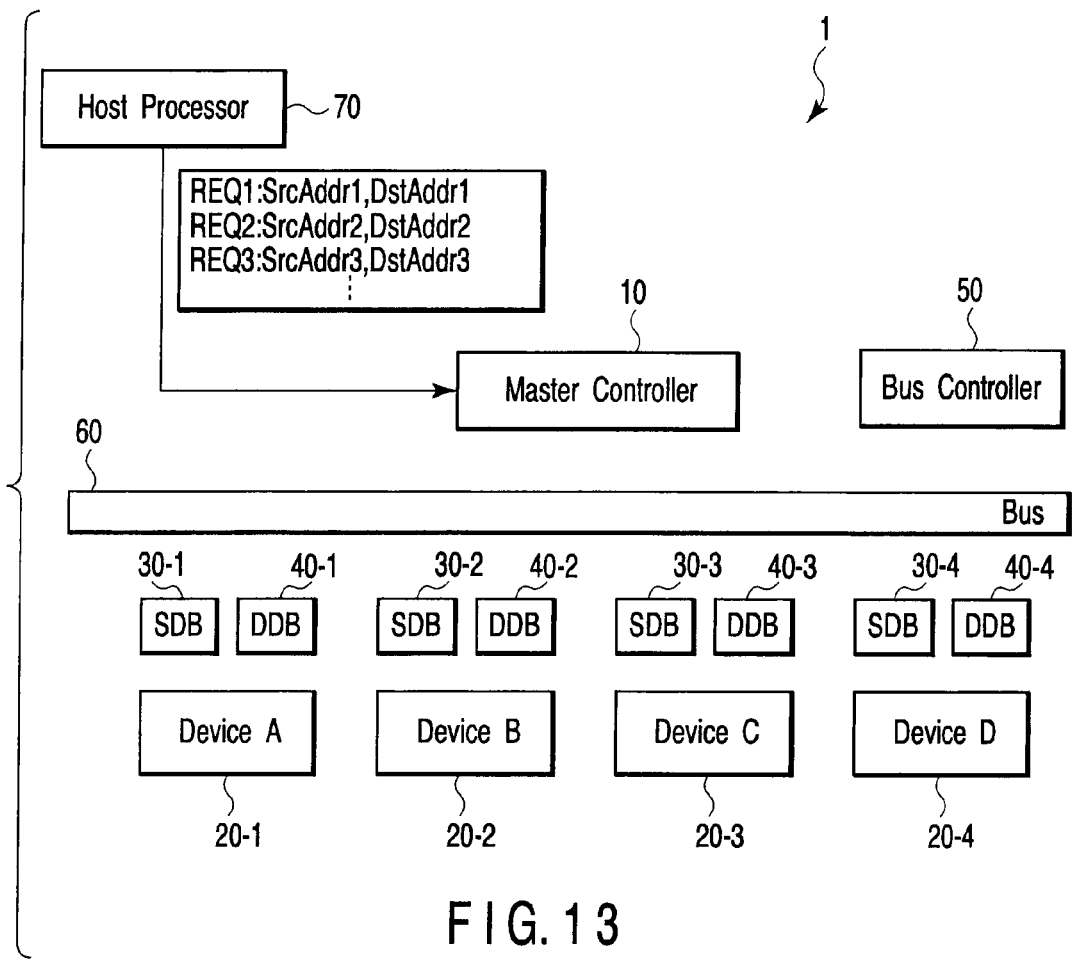
FIG. 13 is a block diagram of the semiconductor integrated circuit device according to the second embodiment of the present invention.

To start with, the process in the stage 1 is executed. The host processor 70 outputs a request instruction, REQ1 to REQn (n: natural number), to the MC 10 (step S40). FIG. 13 illustrates this state. As is shown in FIG. 13, the host processor 70 sends a transfer-source address SrcAddr and a transfer-destination address DstAddr, as well as the request instruction, to the MC 10. The transfer-source address SrcAddr is an address of an area in the transfer-source device, where data to be transferred is stored.

Upon receiving the request instruction, REQ1 to REQn, the MC 10 updates the request table 12 (step S41). That is, the request table 12 stores the request content, and the empty/non-empty states of the associated SDB and DDB. The MC 10 checks whether the SDB of the transfer-source device is empty (step S42). This is implemented by reference to the request table 12. In place of step S41, the SDB and DDB may be confirmed in this step S42 and the information relating to the SDB and DDB may be written in the request table 12. Data transfer is executed with respect to the device, the SDB of which is in the empty state. Thus, if the SDB is in use (step S43), the MC 10 keeps the associated request instruction outstanding until the SDB becomes empty, and executes a different process if there is another request (step S44).

If the SDB of the transfer-source device is empty (step S43), the MC 10 instructs any one of the devices A to D to read out data into the SDB (step S45). This instruction is referred to as "read-out instruction". The read-out instruction includes the transfer-source address SrcAddr. If request instructions are given and there are a plurality of devices whose SDBs are empty, the arbiter 11 selects the device, for which the request instruction is to be preferentially executed, and thus the process in step S45 is executed.

The device which has received the data read-out instruction reads out data, which is stored at the transfer-source address SrcAddr, into the SDB (step S46). If the data write in the SDB is completed, the transfer-source device outputs an acknowledge signal to the MC 10 (step S47).

The process in the stage 1 is thus completed, and the MC 10 that has received the acknowledge signal advances to the process of the stage 2. In this embodiment, since the request table 12 is updated in step S41, it is not necessary to execute the process of step S20. Thus, the stage 2 begins with the process of step S21. The subsequent process is the same as has been described in connection with the first embodiment. In the present embodiment, too, the stages 1 to 3 are processed in the pipeline fashion.

As has been described above, according to the present embodiment, even in the case where the transfer instruction is received from a block other than devices that execute mutual data transmission/reception, the advantageous effects (1) to (4) that have been described in connection with the first embodiment can be obtained.

Next, a semiconductor integrated circuit device and a data transfer method according to a third embodiment of the present invention are described. In the third embodiment, the transfer-source device, in place of the MC 10 in the second embodiment, checks the empty/non-empty state of the SDB.

Figure 14:
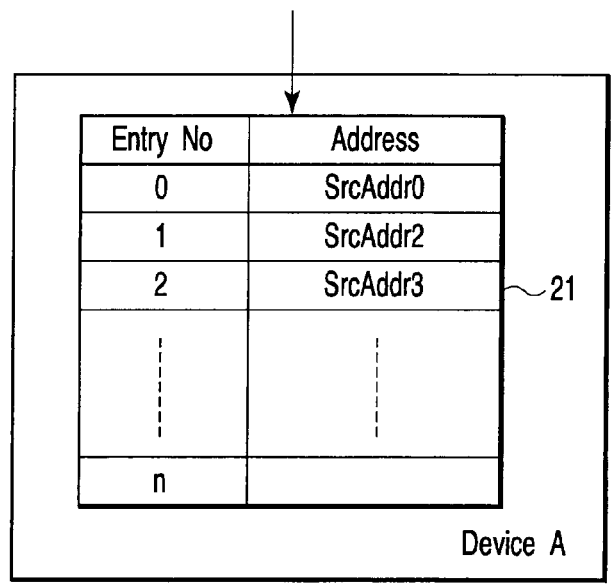
FIG. 14 is a block diagram of a master controller that is provided in a semiconductor integrated circuit device according to a third embodiment of the invention.

FIG. 14 is a block diagram of the device A included in the LSI 1 according to the third embodiment. As is shown in FIG. 14, the device A includes a memory 21 having a plurality of entries. The memory 21 stores transfer-source addresses SrcAddr, which are sent from the MC 10, at the respective entries. Similarly, the devices B to D include memories 21. In the other respects, the structure of the third embodiment is the same as that of the second embodiment as shown in FIG. 11, so a description is omitted here.

Figure 15:
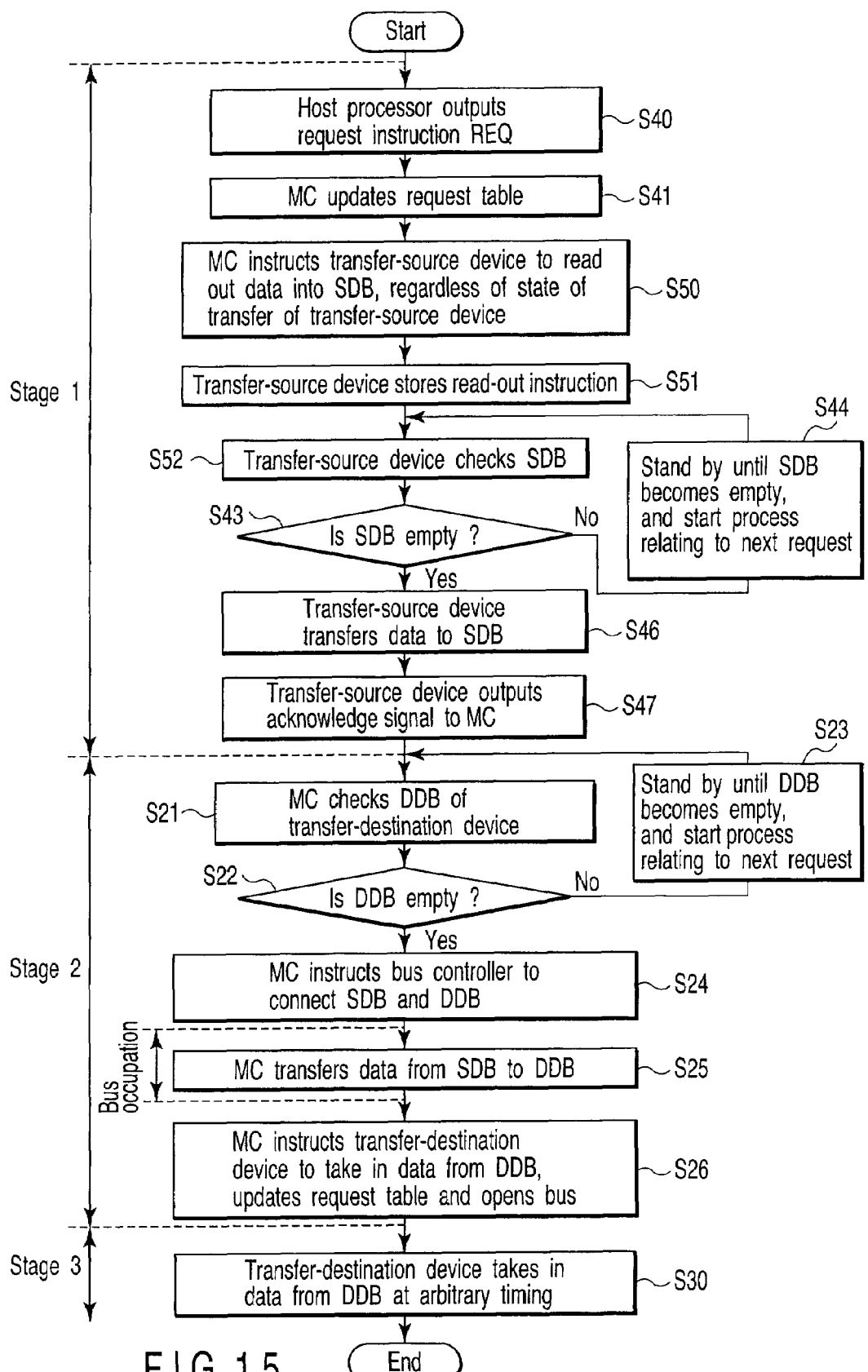
FIG. 15 is a flow chart of a data transfer method that is executed by the semiconductor integrated circuit device according to the third embodiment of the invention.

A data transfer method executed by the LSI 1 of this embodiment is described with reference to a flow chart of FIG. 15. Following the steps S40 and S41 that have been described in connection with the second embodiment, the MC 10 outputs read-out instructions on the basis of a request instruction REQ, thus instructing the transfer-source device to read out data into the SDB (step S50). The read-out instructions are successively output, without consideration to the data transfer state of the transfer-source device, that is, the empty/non-empty state of the SDB.

The transfer-source device, which has received the read-out instruction, stores the read-out instruction (source address SrcAddr) in the memory 21 (step S51). Specifically, the transfer-source device can store a number of read-out instructions, which corresponds to the number of entries in the memory 21. Subsequently, the transfer-source device confirms the empty/non-empty state of the SDB (step S52).

If the SDB is empty (step S43), the transfer-source device reads out the data, which is designated by the read-out instruction, into the SDB (step S53). In this case, the data read-out to the SDB may be executed in the order of reception of read-out instructions, or in an altered order. For example, when the MC 10 outputs the read-out instruction to the transfer-source device, the MC 10 may also send information about the state of the DDB of a transfer-destination device, and the transfer-source device may preferentially read out data relating to the request instruction associated with the empty DDB, on the basis of the information about the state of the DDB.

After the transfer-source device reads out the data into the SDB (step S46), it returns an acknowledge signal to the MC 10 (step S47). In this case, the transfer-source device sends, for instance, the transfer-source address SrcAddr, along with the acknowledge signal, to the MC 10. Thereby, the MC 10 can understand with respect to which request instruction the transfer-source device has completed the data read-out.

Subsequently, the process beginning with the stage 2 (step S21), which has been described in connection with the second embodiment, is executed.

With the data transfer method according to the above-described third embodiment, the same advantageous effects (1) to (4) as with the first and second embodiments are obtained. Additionally, the following advantageous effects (5) and (6) can be obtained.

(5) The Load on the MC 10 can be Reduced.

According to the structure of this embodiment, each device includes the memory 21 having a plurality of entries. Transfer-source addresses SrcAddr, which are sent from the MC 10, are stored at the entries. Since each device can store the plural transfer-source addresses SrcAddr, the MC 10 does not need to confirm the empty/non-empty state of the SDB of the transfer-source device, and the load of processing on the MC 10 can be reduced.

(6) The Data Transfer Efficiency can be Improved (Part 4).

As stated in connection with the above advantageous effect (5), each device stores a plurality of transfer-source addresses SrcAddr. Thus, the transfer-source device can execute data read-out with respect to an arbitrary one of the plurality of transfer-source addresses SrcAddr, which are stored in itself. In other words, the transfer-source device can execute data transfer to the SDB in an out-of-order fashion. Thus, the data transfer efficiency can be improved. This point will further be described below.

First, as described above, the data transfer can be executed with respect to the request instruction that is associated with the empty DDB. Therefore, the transfer efficiency can be improved.

Second, in the device associated with the data transfer, there is a predetermined delay time from reception of a transfer instruction from the MC 10 to data write in the SDB, or to data read-out from the DDB. There is a case in which this delay time varies from address to address even within the same device. Thus, the transfer-source device confirms the transfer-source addresses SrcAddr stored in the memory 21, and transfers the data, which can be read out earliest. Thereby, the transfer efficiency can be enhanced.

Next, a semiconductor integrated circuit device and a data transfer method according to a fourth embodiment of the present invention are described. In the fourth embodiment, each of the SDB and DDB in the third embodiment includes a plurality of entries.

Figures 16, 17:
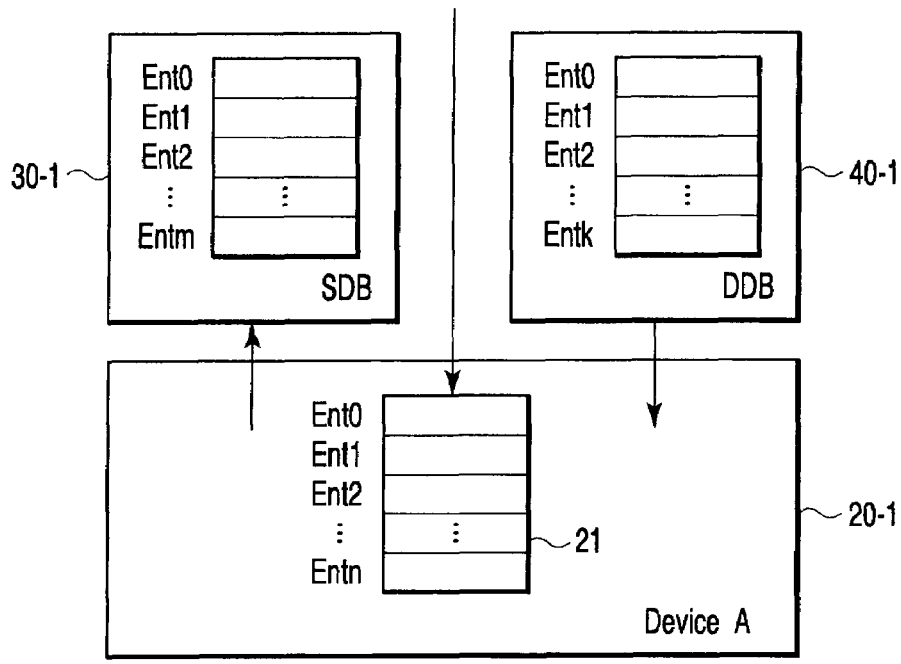
FIG. 16 is a block diagram of a master controller, a source data buffer and a destination data buffer that are provided in a semiconductor integrated circuit device according to a fourth embodiment of the invention.
FIG. 17 is a conceptual view of a request table that is provided in the master controller according to the fourth embodiment of the invention.

FIG. 16 is a block diagram showing a device A, an SDB 30-1 and a DDB 40-1, which are included in the LSI 1 according to the fourth embodiment. As is shown in FIG. 16, the device A includes the memory 21 which has been described in connection with the third embodiment. The SDB 30-1 includes (m+1) entries (m: a natural number of 1 or more), and the DDB 40-1 includes (k+1) entries (k: a natural number of 1 or more). Similarly, each of the devices B to D includes the memory 21, and each of the SDBs 30-2 to 30-4 and each of the DDBs 40-2 to 40-4 includes a plurality of entries. Thus, each of the SDBs 30-1 to 30-4 and each of the DDBs 40-1 to 40-4 can store a plurality of transfer data. FIG. 17 is a conceptual view of a request table 12 included in the MC 10 according to this embodiment. As is shown in FIG. 17, the request table 12 according to the present embodiment stores the contents of request instructions, transfer-source addresses and transfer-destination addresses, which correspond to the respective entries in the SDB and DDB, in association with the devices A to D. In the other respects, the structure of the fourth embodiment is the same as that of the third embodiment.

Figure 18:
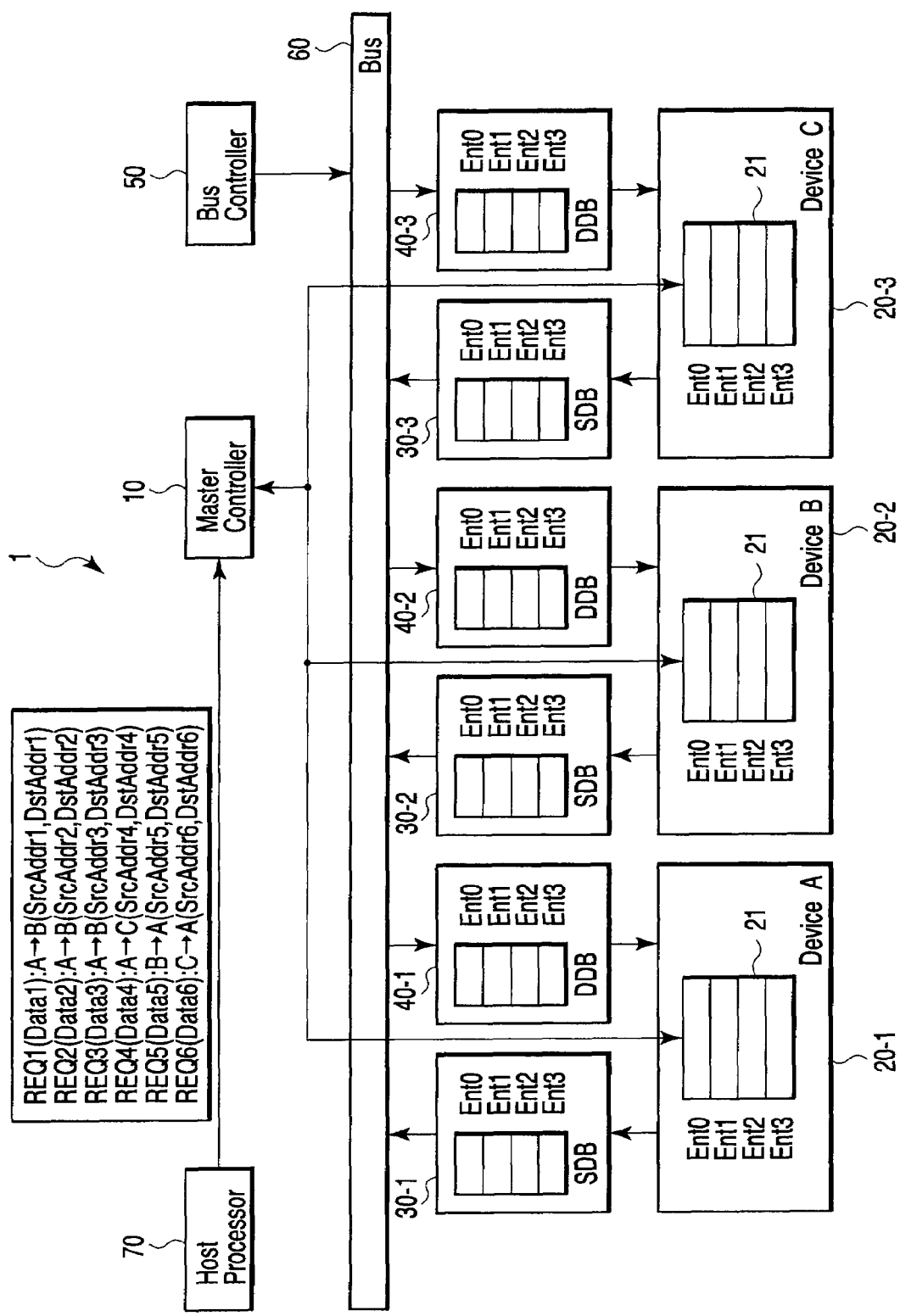
FIG. 18 is a block diagram of the semiconductor integrated circuit device according to the fourth embodiment of the invention.
Figure 19:
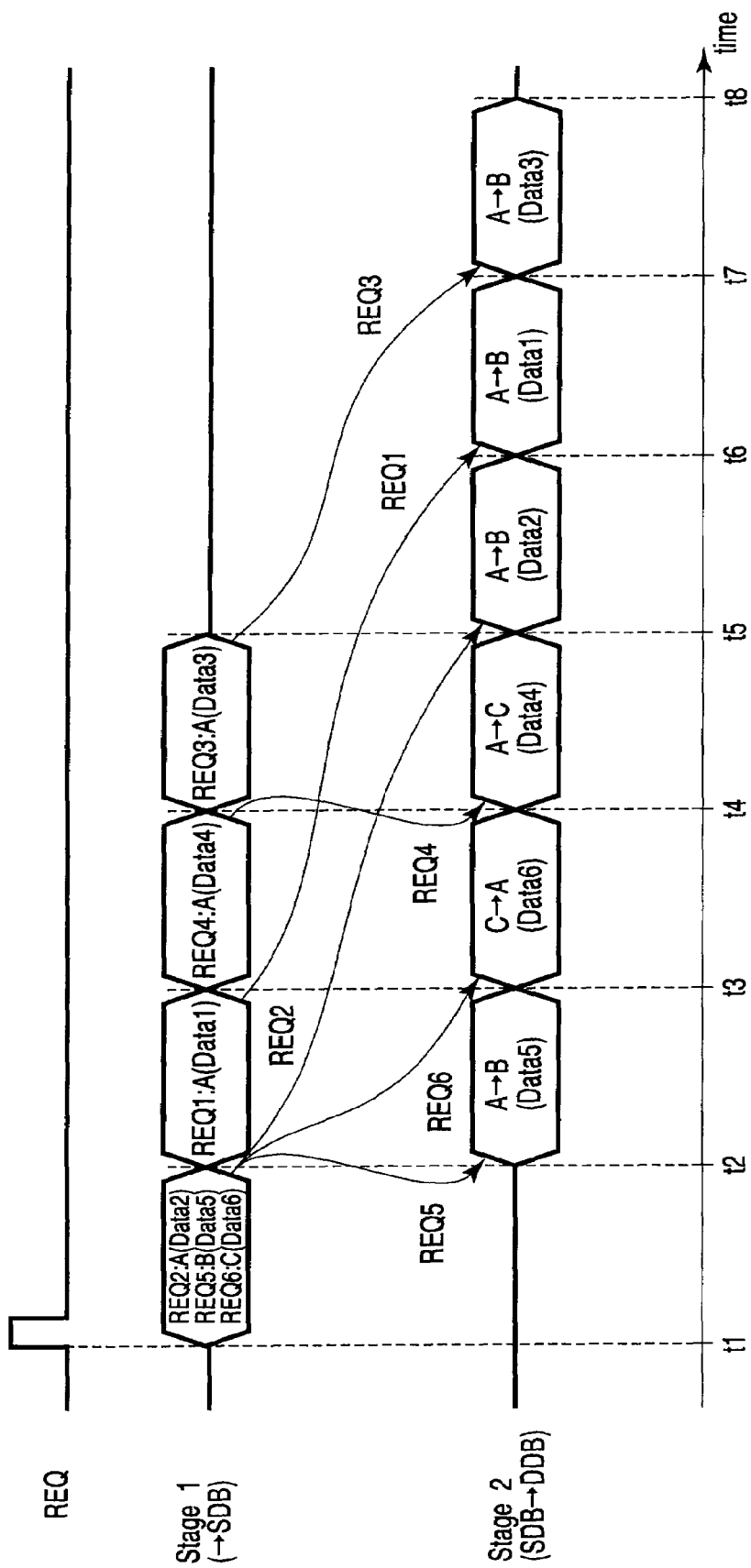
FIG. 19 is a timing chart that illustrates a scheme of data transfer by the semiconductor integrated circuit device according to the fourth embodiment of the invention.

Next, a data transfer method executed by the LSI 1 according to the present embodiment is described. The process of data transfer according to this embodiment is substantially the same as illustrated in the flow chart of FIG. 15 in connection with the third embodiment. The data transfer process of the fourth embodiment differs from that of the third embodiment in that the SDB and DDB store a plurality of transfer data. For simple description, assume now that the LSI 1 comprises three devices A to C, and that the number of entries in the memory 21, each of the SDBs 30-1 to 30-3 and each of the DDBs 40-1 to 40-3 is four, as shown in FIG. 18. In addition, assume that the data transfer is executed in an order as illustrated in FIG. 19. FIG. 19 is a timing chart showing the processes in stages 1 and 2.

To start with, as shown in FIG. 18, the host processor 70 delivers six request instructions REQ1 to REQ6 to the MC 10 (step S40). The contents of request instructions REQ1 to REQ6 are as follows:

\*REQ1: To transfer data 1, which is stored in device A, to device B;

Address in device A where data 1 is stored=SrcAddr1,

Address in device B where data 1 is to be stored=DstAddr1,

\*REQ2: To transfer data 2, which is stored in device A, to device B;

Address in device A where data 2 is stored=SrcAddr2,

Address in device B where data 2 is to be stored=DstAddr2,

\*REQ3: To transfer data 3, which is stored in device A, to device B;

Address in device A where data 3 is stored=SrcAddr3,

Address in device B where data 3 is to be stored=DstAddr3,

\*REQ4: To transfer data 4, which is stored in device A, to device C;

Address in device A where data 4 is stored=SrcAddr4,

Address in device C where data 4 is to be stored=DstAddr4,

\*REQ5: To transfer data 5, which is stored in device B, to device A;

Address in device B where data 5 is stored=SrcAddr5,

Address in device A where data 5 is to be stored=DstAddr5,

\*REQ6: To transfer data 6, which is stored in device C, to device A;

Address in device C where data 6 is stored=SrcAddr6,

Address in device A where data 6 is to be stored=DstAddr6.

As is shown in FIG. 20, the MC 10, which has received the request instructions REQ1 to REQ6, forwards read-out instructions based on the request instructions REQ1 to REQ4 to the device A, forwards a read-out instruction based on the request instruction REQ5 to the device B, and forwards a read-out instruction based on the request instruction REQ6 to the device C (step S50).

The devices A to C, which have received the read-out instructions, store transfer-source addresses in their memories 21 (step S51). Specifically, the entries 0 to 3 in the memory 21 of device A store addresses SrcAddr1 to SrcAddr4, the entry 0 in the memory 21 of device B stores an address SrcAddr5, and the entry 0 in the memory 21 of device C stores an address SrcAddr6.

Figure 21:
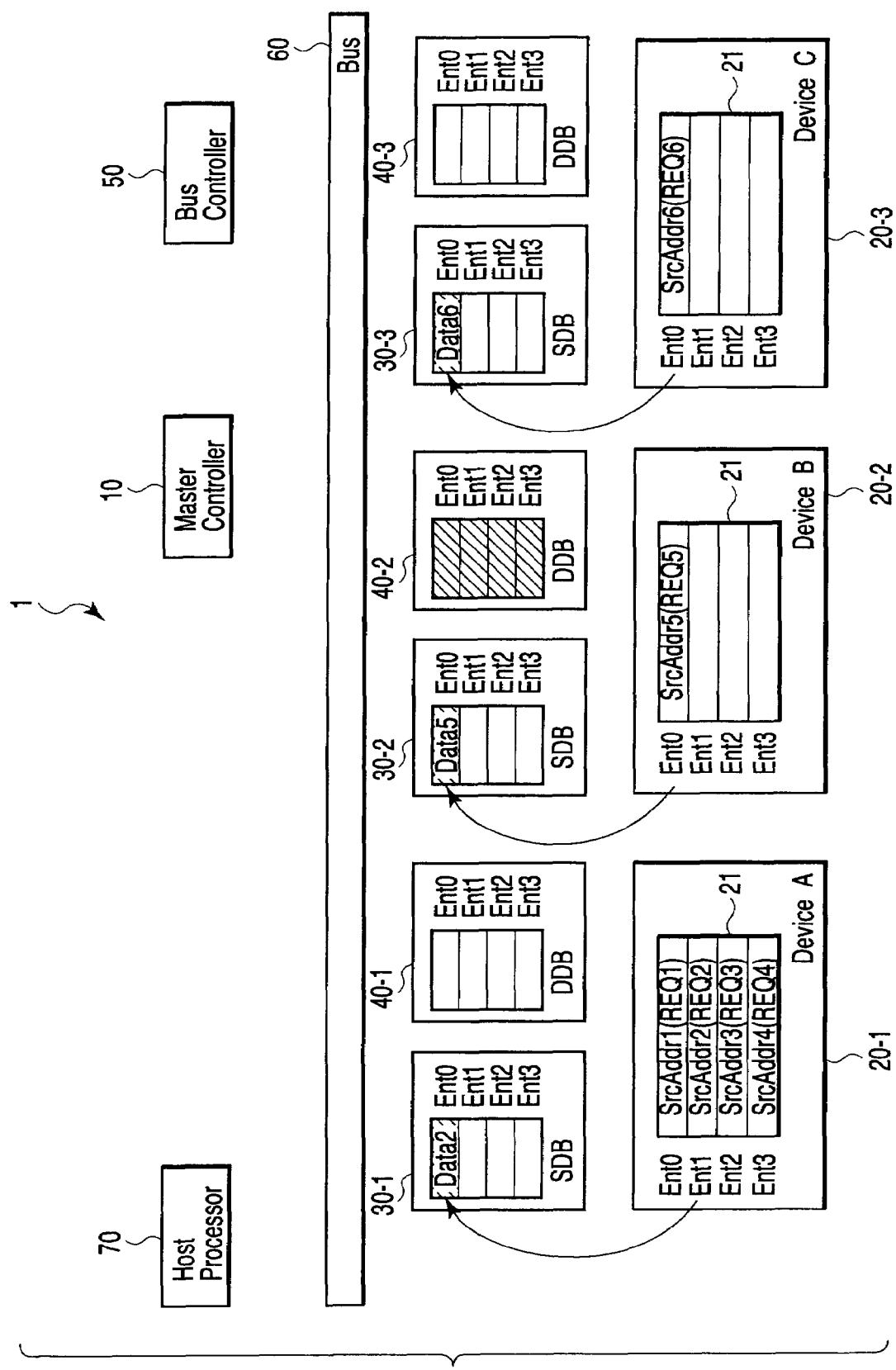
FIG. 21 is a block diagram of the semiconductor integrated circuit device according to the fourth embodiment of the invention.

Subsequently, the devices A to C check the empty/non-empty states of the SDBs 30-1 to 30-3 and transfer data to empty entries. Assume now that all entries in the SDBs 30-1 to 30-3 are empty. The device A reads out data 2, which can be read out earliest, from the address SrcAddr2, and writes the read-out data 2 in the entry 0 of the SDB 30-1 (step S52, S43, S44, time instant t1 in FIG. 19). The device B reads out data 5 from the address SrcAddr5, and writes the read-out data 5 in the entry 0 of the SDB 30-2. The device C reads out data 6 from the address SrcAddr6, and writes the read-out data 6 in the entry 0 of the SDB 30-3. FIG. 21 illustrates this process.

When the data write in the SDBs 30-1 to 30-3 is completed, the devices A to C return acknowledge signals to the MC 10 (step S47). Responding to the acknowledge signals, the MC 10 updates the request table 12. FIG. 22 shows the updated request table 12. As is shown in FIG. 22, the entry 0 of the SDB of device A, the entry 0 of the SDB of device B and the entry 0 of the SDB of device C store information corresponding to the request instructions REQ2, REQ5 and REQ6. It is supposed that all entries of the DDB 40-2 of device B are in use.

Figure 23:
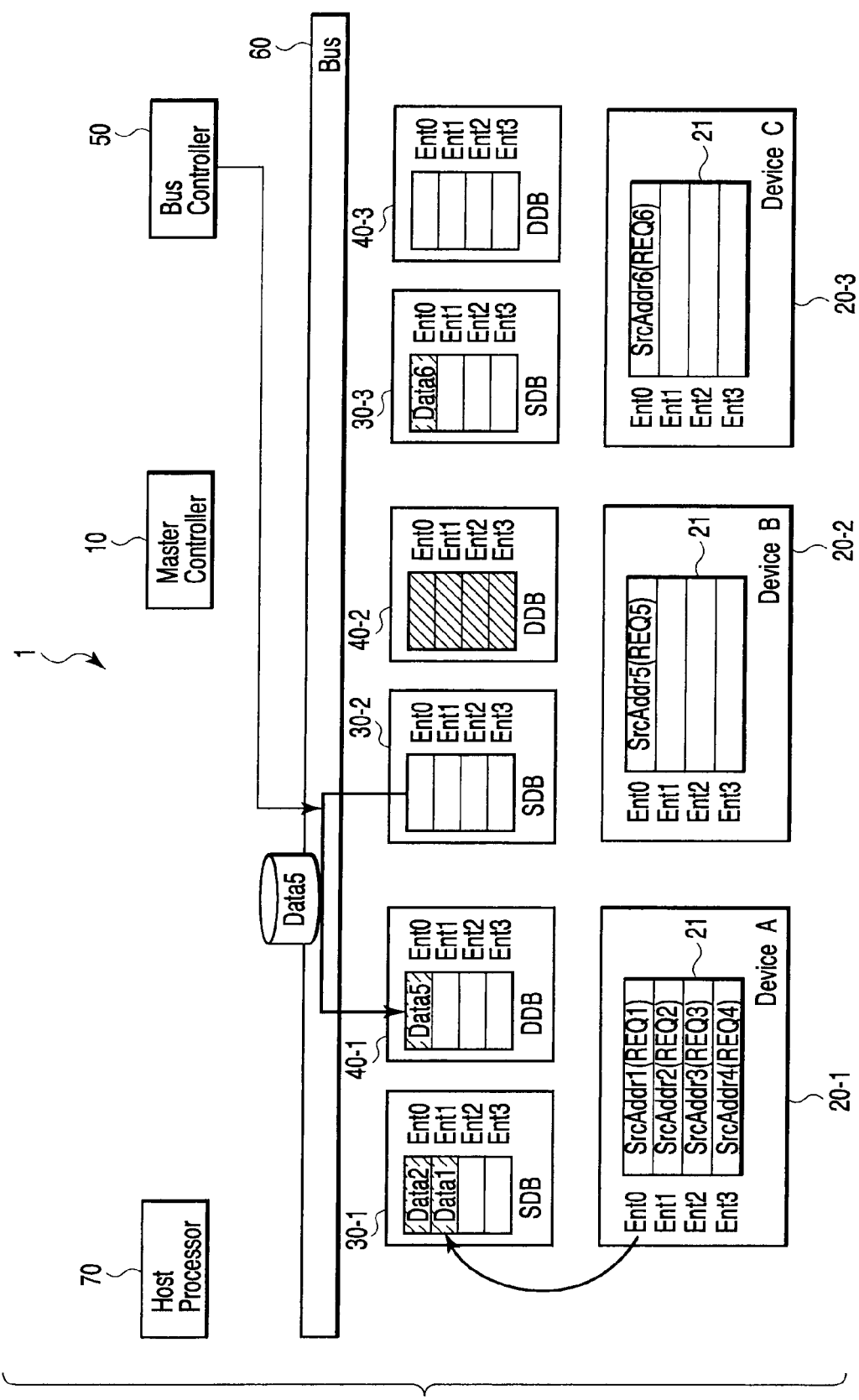
FIG. 23 is a block diagram of the semiconductor integrated circuit device according to the fourth embodiment of the invention.

At time instant t2, the MC 10 starts the process of stage 2. The arbiter 11 determines which of the request instructions REQ2, REQ5 and REQ6 is to be executed. For this purpose, the arbiter 11 checks the request table 12 and confirms the empty/non-empty states of the DDBs (step S21). It is understood from the request table 12 that the DDB 40-1 of device A and the DDB 40-3 of device C are empty and the DDB 40-2 of device B is all in use (step S43). Since the request instructions REQ5 and REQ6 are executable, the arbiter 11 executes, for instance, the request instruction REQ5. Specifically, as shown in FIG. 23, the arbiter 11 instructs the bus controller 50 to connect the devices A and B (step S24). The data 5 within the entry 0 of the SDB 30-2 of device B is transferred to the entry 0 of the DDB 40-1 of device A (step S25). Upon completion of the data transfer, the MC 10 opens the bus 60 and instructs the device A to write the data 5, which is stored in the DDB 40-1, into the address DstAddr5 (step S26).

In addition, at time instant t2, as shown in FIG. 23, the device A continues the process of stage 1. The read-out instructions based on the request instructions REQ1, REQ3 and REQ4 are still outstanding in the device A. After the device A checks the empty/non-empty states of the SDB 30-1 (step S52), the device A reads out the data 1, which is based on the request instruction REQ1, from the address SrcAddr1 and writes the data 1 in the entry 1 of the SDB 30-1 (step S43, S44). The device A then returns an acknowledge signal to the MC 10 (step S47).

When the transfer of the data 5 (step S25) is completed and the acknowledge signal from the device A is received, the MC 10 updates the request table 12 (step S26). FIG. 24 shows the updated request table. As is shown in FIG. 24, the information corresponding to the request instruction REQ1 is stored in the entry 1 of the SDB of device A. Since the data 5 has been transferred from the device B to the device A, the information corresponding to the request instruction REQ5 is deleted from the device B and is rewritten in the entry 0 of the device A.

Figure 25:
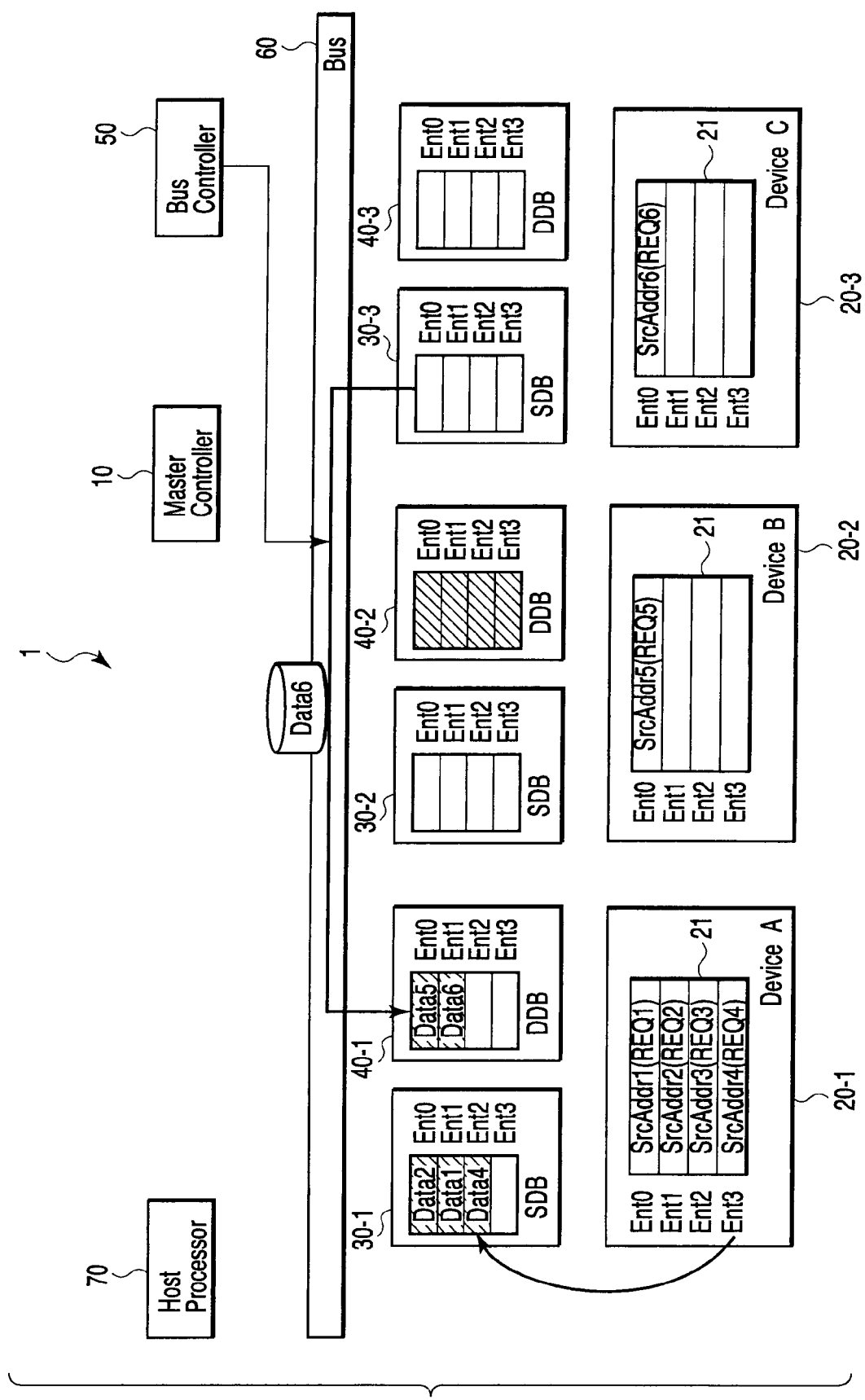
FIG. 25 is a block diagram of the semiconductor integrated circuit device according to the fourth embodiment of the invention.

At time instant t3, the arbiter 11 determines which of the request instructions REQ1, REQ2 and REQ6 is to be executed. Since the DDB of device B is still all in use (step S21, S22), the arbiter 11 executes the request instruction REQ6. Specifically, as shown in FIG. 25, the arbiter 11 instructs the bus controller 50 to connect the device A and device C (step S24). The data 6 in the entry 0 of the SDB 30-3 of device C is transferred to the entry 1 of the DDB 40-1 of device A (step S25). Upon completion of the transfer, the MC 10 opens the bus 60 and instructs the device A to write the data 6, which is stored in the DDB 40-1, into the address DstAddr6 (step S26).

In addition, at time instant t3, as shown in FIG. 25, the device A continues the process of stage 1. The read-out instructions based on the request instructions REQ3 and REQ4 are still outstanding in the device A. After the device A checks the empty/non-empty states of the SDB 30-1 (step S52), the device A reads out the data 4, which is based on the request instruction REQ4, from the address SrcAddr4 and writes the data 4 in the entry 2 of the SDB 30-1 (step S43, S44). The device A then returns an acknowledge signal to the MC 10 (step S47).

If the transfer of the data 6 (step S25) is completed and the acknowledge signal from the device A is received, the MC 10 updates the request table 12 (step S26). FIG. 26 shows the updated request table. As is shown in FIG. 26, the information corresponding to the request instruction REQ4 is stored in the entry 2 of the SDB of device A. Since the data 6 has been transferred from the device C to the device A, the information corresponding to the request instruction REQ6 is deleted from the device C and is rewritten in the entry 1 of the device A.

Figure 27:
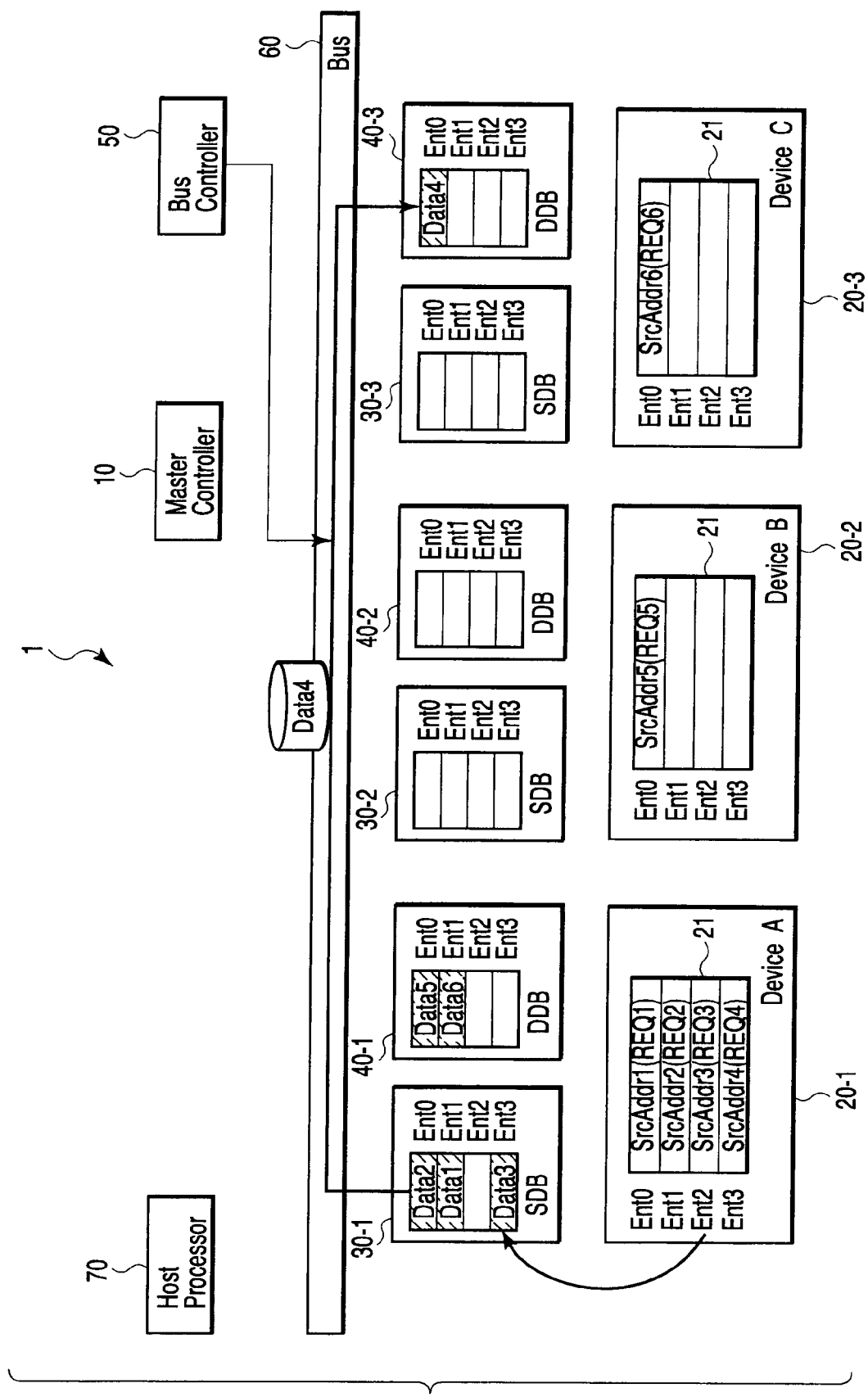
FIG. 27 is a block diagram of the semiconductor integrated circuit device according to the fourth embodiment of the invention.

At time instant t4, the arbiter 11 determines which of the request instructions REQ1, REQ2 and REQ4 is to be executed. Since the DDB of device B is still all in use (step S21, S22), the arbiter 11 executes the request instruction REQ4. Specifically, as shown in FIG. 27, the arbiter 11 instructs the bus controller 50 to connect the device A and device C (step S24). The data 4 in the entry 2 of the SDB 30-1 of device A is transferred to the entry 0 of the DDB 40-3 of device C (step S25). Upon completion of the transfer, the MC 10 opens the bus 60 and instructs the device C to write the data 4, which is stored in the DDB 40-3, into the address DstAddr4 (step S26).

In addition, at time instant t4, as shown in FIG. 27, the device A continues the process of stage 1. Specifically, the device A reads out the data 3, which is based on the request instruction REQ3, from the address SrcAddr3 and writes the data 3 in the entry 3 of the SDB 30-1 (step S52, S43, S44, S46). The device A then returns an acknowledge signal to the MC 10 (step S47).

If the transfer of the data 4 (step S25) is completed and the acknowledge signal from the device A is received, the MC 10 updates the request table 12 (step S26). FIG. 28 shows the updated request table. As is shown in FIG. 28, the information corresponding to the request instruction REQ3 is stored in the entry 3 of the SDB of device A. Since the data 4 has been transferred from the device A to the device C, the information corresponding to the request instruction REQ4 is deleted from the device A and is rewritten in the entry 0 of the DDB of the device C. Assume that at this time instant all the entries in the DDB 40-2 of device B have become empty.

At time instant t5, the arbiter 11 determines which of the request instructions REQ1, REQ2 and REQ3 is to be executed. Since the DDB of device B is empty (step S21, S22), the arbiter 11 executes the request instruction REQ2, with respect to which data write to the device B is executable earliest. Specifically, the arbiter 11 instructs the bus controller 50 to connect the device A and device B, and transfers the data 2 in the entry 0 of the SDB 30-1 of device A to the entry 0 of the DDB 40-2 of device B (step S24, S25). Thereafter, the MC 10 opens the bus 60 and instructs the device B to write the data 2, which is stored in the DDB 40-2, into the address DstAddr2 (step S26). Further, the MC 10 updates the request table (step S26).

Subsequently, at time instants t6 and t7, the arbiter 11 executes the request instructions REQ1 and REQ3 in the same manner, and transfers the data 1 and data 3 from the device A to the device B.

Through the above-described process, the execution of the request instructions REQ1 to REQ7 by the host processor 70 is completed. Although a description of data write from the DDBs to the devices is omitted, this data write process may be executed by each device at an arbitrary timing. If a plurality of data are present in the DDB, the data write may be executed in an order of addresses beginning with one for which the data write is executable earliest.

With the LSI according to the above-described fourth embodiment of the invention, the following advantageous effect (7) can be obtained in addition to the advantageous effects (1) to (6).

(7) The Data Transfer Efficiency can be Improved (Part 5).

According to the structure of the fourth embodiment, each of the SDB and DDB includes a plurality of entries and thus can store a plurality of transfer data. The MC 10 can optimally alter the order of transfer of data read out into the SDB by the transfer-source device. In addition, the transfer-destination device can take in the plural data, which are stored in the DDB, in the optimal order. The data transfer in the out-of-order fashion can be implemented, and the standby time for the execution of transfer can be reduced. Therefore, the transfer efficiency can be enhanced.

Figure 29:
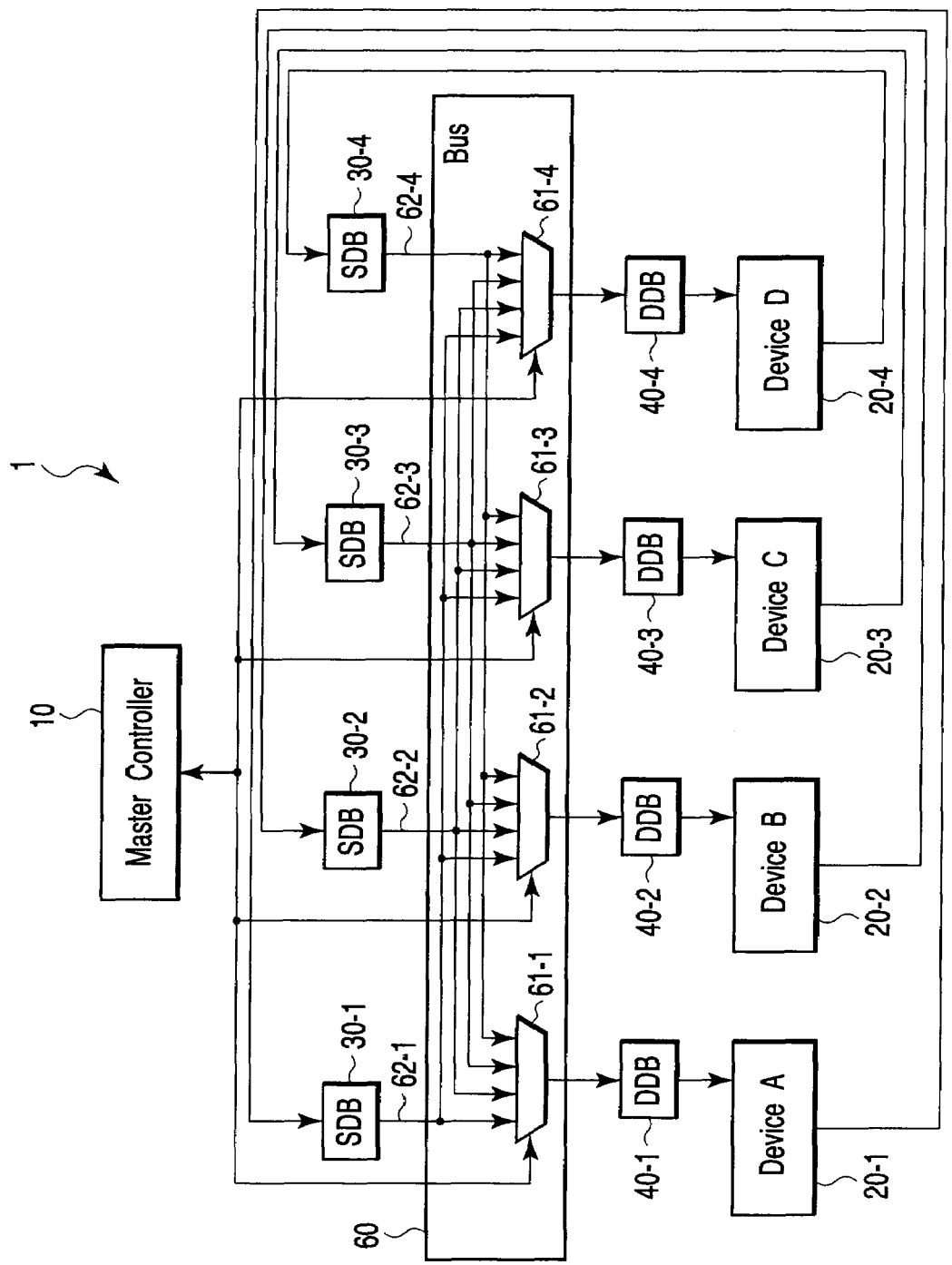
FIG. 29 is a block diagram of a semiconductor integrated circuit device according to a fifth embodiment of the invention.

Next, a semiconductor integrated circuit device and a data transfer method according to a fifth embodiment of the present invention are described. In the fifth embodiment, the bus 60 in each of the first to fourth embodiment is configured to have an interconnection-type network architecture. FIG. 29 is a block diagram of an LSI 1 according to the fifth embodiment. The fifth embodiment is common to the first to fourth embodiments except for the bus architecture, so a description of common parts is omitted.

As is shown in FIG. 29, the bus 60 has an interconnection-type network architecture. The interconnection-type network is a set of transmission lines associated with all combinations of devices A to D. The bus 60 comprises multiplexers 61-1 to 61-4 and data transmission lines 62-1 to 62-4. The transmission line 62-1 transmits an output from the SDB 30-1 to the inputs of the multiplexers 61-1 to 61-4. The transmission line 62-2 transmits an output from the SDB 30-2 to the inputs of the multiplexers 61-1 to 61-4. The transmission line 62-3 transmits an output from the SDB 30-3 to the inputs of the multiplexers 61-1 to 61-4. The transmission line 62-4 transmits an output from the SDB 30-4 to the inputs of the multiplexers 61-1 to 61-4. The transmission lines 62-1 to 62-4 transfer data independently. The multiplexer, 61-1 to 61-4, selects any one of the transmission lines 62-1 to 62-4, and outputs data, which is sent through the selected transmission line, to the associated DDB, 40-1 to 40-4. The arbiter 11 of the MC 10 executes a control as to which of the transmission lines 62-1 to 62-4 is to be selected by the multiplexer, 61-1 to 61-4.

In the above-described structure, if the number of devices that are connected is n, an n-number of data can be transferred via the interconnection-type network. In this case, the structure that includes a given transfer-source device, a given transfer-destination device and a transmission line that connects these devices is equivalent to the structure as described in the first to fourth embodiments. Thus, the above-described embodiments can be implemented with the application of the interconnection-type network.

With the structure according to the present embodiment, the following advantageous effect (8) can be obtained in addition to the advantageous effects (1) to (7).

(8) The Data Transfer Efficiency can be Improved (Part 6).

According to the present embodiment, with use of the interconnection-type network, the same number of data as the transmission lines 62-1 to 62-4 can be transferred in parallel. Thus, the data transfer efficiency can be improved. FIG. 29 exemplifies the case in which the multiplexers 61-1 to 61-4 are controlled by the MC 10. Alternatively, the multiplexers 61-1 to 61-4 may be controlled by the devices A to D.

According to the first to fifth embodiments, as described above, the buffers that can store transfer data are provided in association with the respective devices. Thus, the time needed for handshake at the time of data transfer can be reduced, and the data transfer speed can be increased. In addition, since the occupation time of the bus can be reduced, the data transfer efficiency can be enhanced. Moreover, since each device includes the memory that can store a plurality of request instructions and each buffer includes a plurality of entries, the data transfer can be executed out of order, and the data transfer efficiency can be improved.

FIG. 30 is a block diagram of a host processor 70 and an MC 10 that are included in an LSI 1 according to a modification of the first to fifth embodiments. As is shown in FIG. 30, the host processor 70 sends to the MC 10 not the data transfer request instruction itself, but a task or task-related information. The MC 10 includes a scheduler 13, which analyzes the task that is sent from the host processor 70, and recognizes data transfer that is necessary for execution of the task. Based on the analysis result, the scheduler 13 generates request instructions and registers them in the request table 12. If an order of priority is needed for the data transfer, the scheduler 13 registers the information of the order of priority in the request table 12 as a priority table. In this case, the arbiter 11 refers to the priority table and executes data transfer in the order of request instructions beginning with one having a highest priority. In this manner, the above-described embodiments can be applied to the case in which the request instructions are generated within the MC 10.

Figure 31:
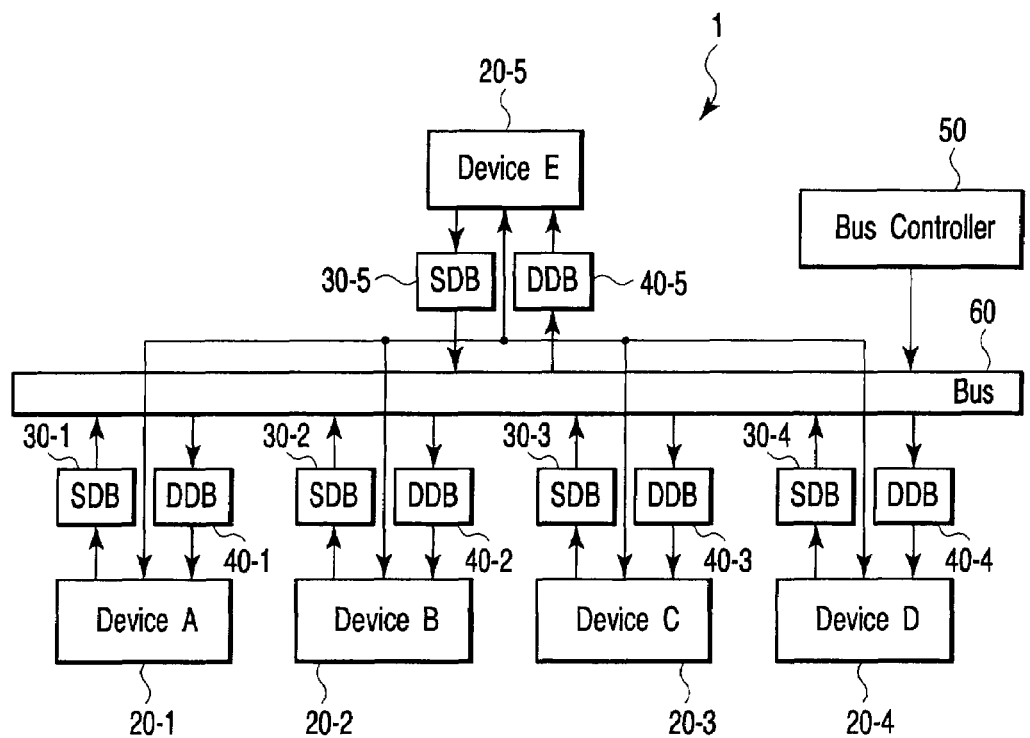
FIG. 31 is a block diagram of a semiconductor integrated circuit device according to a second modification of the first to fifth embodiments of the invention.
Figure 32:
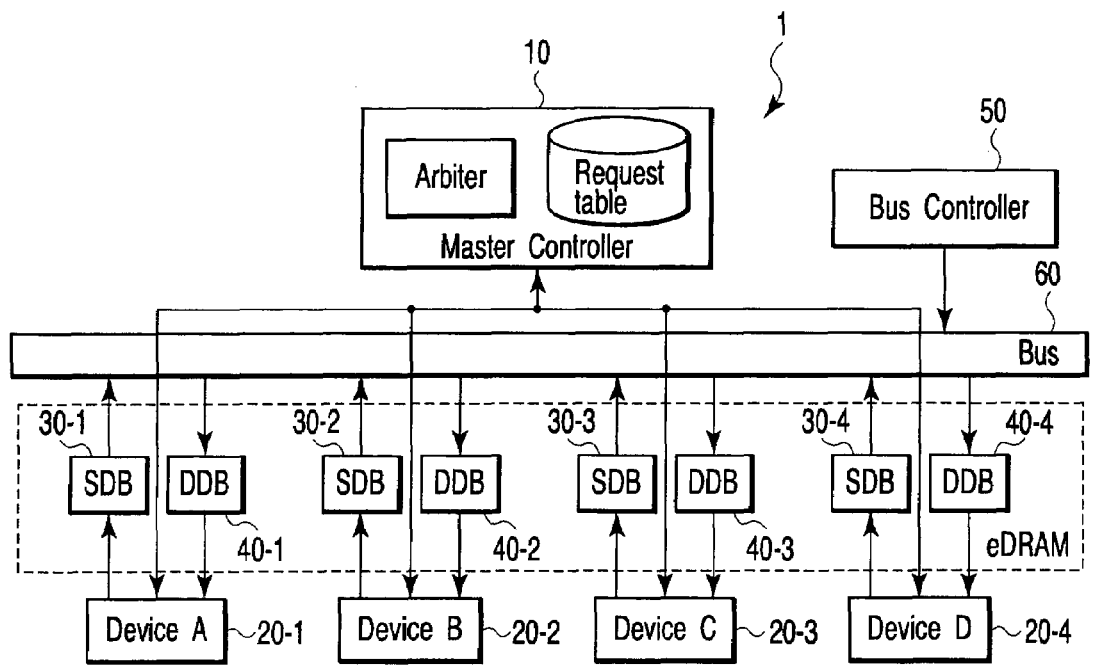
FIG. 32 is a block diagram of a semiconductor integrated circuit device according to a third modification of the first to fifth embodiments of the invention.

In the above-described embodiments, data transfer is controlled by the MC 10, which is provided separately from the devices A to D. However there is no need to provide the MC 10 for the purpose of data transfer. Any one of the devices may double as the MC 10. For example, as shown in FIG. 31, in an LSI 1 including devices A to E, the device E may also serve as the MC 10. Depending on cases, the device that serves as the MC 10 may be changed. Besides, as shown in FIG. 32, an eDRAM (embedded DRAM) may be used for the SDBs and DDBs. Each device may include the associated SDB and DDB as integral parts. Further, in the above-described embodiments, all devices included in the LSI have SDBs and DDBs. However, even in a case where only some of the devices are provided SDBs and DDBs, the same advantageous effects can be obtained. There may be a case in which the device has only one of the SDB and DDB.

In the case where the request instruction is output from the MC 10 after the transfer-source device writes data in the SDB, as in the first embodiment, the request table 12 may not have information relating to the SDB. It should suffice if the request table 12 has information relating to the DDB. The reason is that the SDB must be in use at the time instant when the request instruction has been output.

In the second to fifth embodiments, too, the request instruction may be output from not only the host processor 70 but also the devices A to D. Needless to say, the third and fourth embodiments are applicable to the case in which the MC 10 checks the empty/non-empty state of the SDB, as in the second embodiment.

Figure 33:
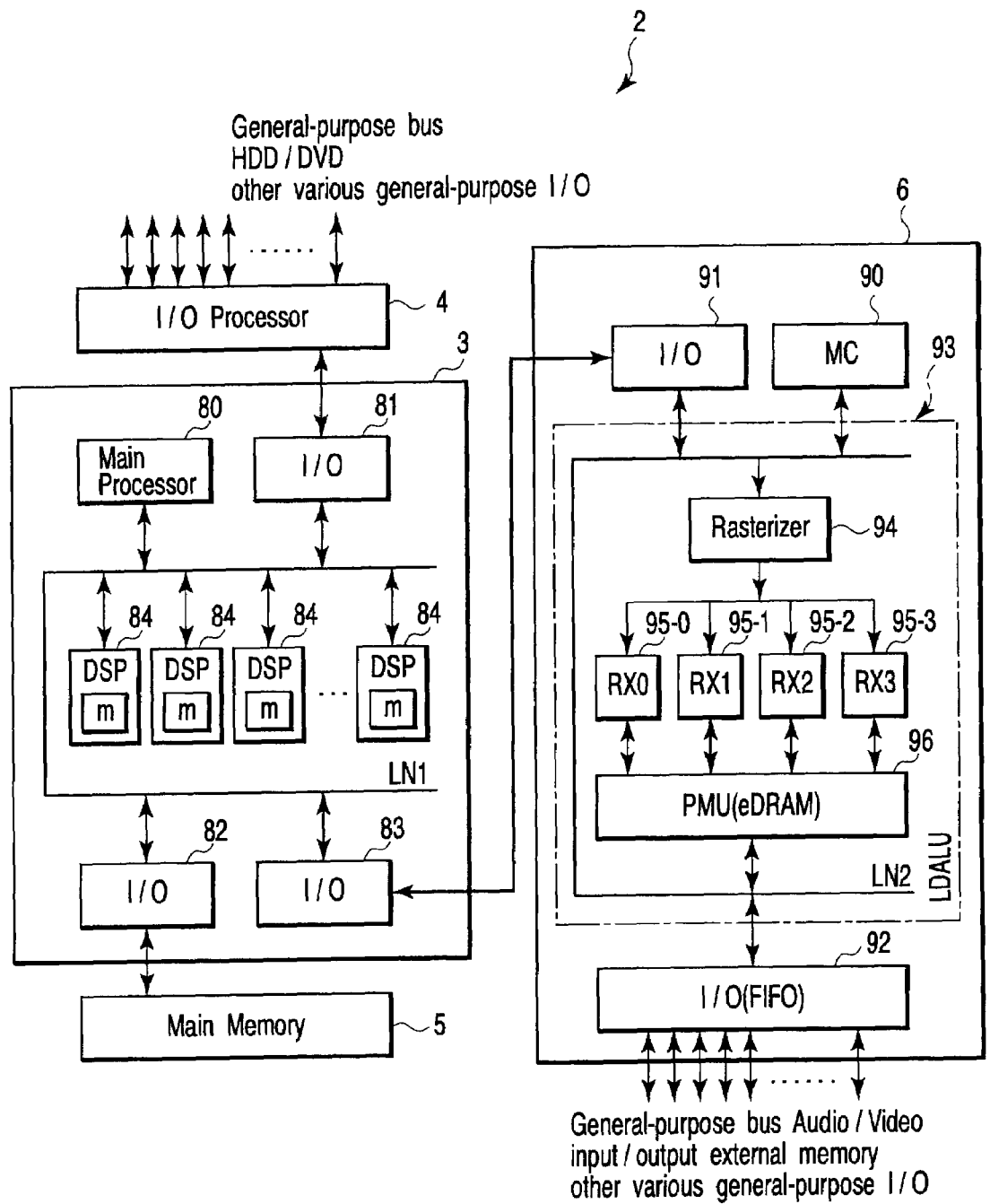
FIG. 33 is a block diagram of an image rendering system LSI that includes the semiconductor integrated circuit device according to the first to fifth embodiments of the invention.

The data transfer device and semiconductor integrated circuit device, which have been described in connection with the above embodiments, are applicable to an image processor, for instance. FIG. 33 is a block diagram that shows an image rendering processor system LSI 2 including the data transfer device according to the above-described embodiments.

As is shown in FIG. 33, the image rendering processor system LSI 2 according to the embodiments includes a host processor 3, an I/O processor 4, a main memory 5 and a graphic processor 6. The host processor 3 and graphic processor 6 are connected over a processor bus BUS so as to be mutually communicable.

The host processor 3 includes a main processor 80, I/O sections 81 to 83, and a plurality of digital signal processors (DSPs) 84. These circuit blocks are connected over a local network LN1 so as to be mutually communicable. The main processor 80 controls the operations of the respective circuit blocks in the host processor 3. The I/O section 81 executes data transmission/reception via the I/O processor 4 between the host processor 3 and the outside. The I/O section 82 executes data transmission/reception with the main memory 5. The I/O section 83 executes data transmission/reception with the graphic processor 6 via the processor bus BUS. The digital signal processors 84 execute signal processing on the basis of data that is read out of the main memory 5 or from the outside.

The I/O processor 4 connects the host processor 3 to, for instance, a general-purpose bus, a peripheral such as an HDD or a DVD (Digital Versatile Disc) drive, and a network. In this case, the HDD or DVD drive may be mounted on the LSI 2 or may be provided outside the LSI 2.

The main memory 5 stores programs that are necessary for the operation of the host processor 3. The programs are read out, for example, from an HDD (not shown) and are loaded in the main memory 5.

The graphic processor 6 includes an MC 90, I/O sections 91 and 92, and an arithmetic process section 93. The MC 90 is the MC 10 that has been described in connection with the first to fifth embodiments. The I/O section 91 controls input/output from/to the host processor 3 via the processor bus BUS. The I/O section 92 controls, for example, input/output from/to various general-purpose buses such as a PCI bus, audio/video input/output, and input/output from/to an external memory. The arithmetic process section 93 executes image processing arithmetic operations.

The arithmetic process section 93 includes a rasterizer 94, a plurality of pixel shaders 95-0 to 95-3, and a packet management unit 96. In this embodiment, the number of pixel shaders is four. However, the number of pixel shaders is not limited to four, and may be 8, 16, 32, etc.

The rasterizer 94 generates pixels in accordance with input graphic information. The pixel is a minimum-unit region that is handled when a given graphic is to be rendered. A graphic is rendered by a set of pixels. The generated pixels are input to the pixel shaders 95-0 to 95-3. The pixel shaders 95-0 to 95-3 execute arithmetic operations based on pixels that are input from the rasterizer 94, and generate image data on realize memories. The packet management unit 96 includes realize memories that are provided in association with the pixel shaders 95-0 to 95-3, respectively. The realize memories are, for instance, eDRAMs that are formed on the same semiconductor substrate. The realize memories store pixel data that are rendered by the pixel shaders 95-0 to 95-3. The MC 90, I/O sections 91 and 92, rasterizer 94 and packet management unit 96 are connected over a local network LN2 so as to be mutually communicable.

In the above structure, the pixel data that are stored in the realize memories are transferred to a FIFO that is included in the I/O section 92, and are output to the outside. The MC 90 controls data transfer between the realize memories and the FIFO of the I/O section 92 by the method that has been described in connection with the first to fifth embodiments. Specifically, the MC 90 corresponds to the MC 10 in the above-described embodiments. Since the image rendering apparatus handles an enormous amount of data, the method of the above-described embodiments is very effective. The MC 10 may be provided within the arithmetic process section 93. In this case, the MC 10 controls data transfer between the rasterizer 94 and pixel shaders 95-0 to 95-3 and data transfer between the pixel shaders 95-0 to 95-3 and the realize memories.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor integrated circuit device which includes a plurality of semiconductor devices, comprising:

a first buffer circuit provided in association with each of the plurality of semiconductor devices, transfer data being read out from the associated semiconductor device into the first buffer circuit when the associated semiconductor device functions as a transfer-source semiconductor device;

a second buffer circuit provided in association with each of the plurality of semiconductor devices, the transfer data being transferred and written in the second buffer circuit when the associated semiconductor device functions as a transfer-destination semiconductor device;

a data bus which transmits the transfer data between the semiconductor devices; and a control circuit which acquires a right of use of the data bus when the transfer data is read out into the first buffer circuit, transfers the transfer data via the data bus to the second buffer circuit associated with the semiconductor device functioning as the transfer-destination semiconductor device, and disclaims the right of use of the data bus after the transfer of the transfer data is completed, the data in the first buffer circuit being transferred to the second buffer circuit according to a control by the control circuit regardless of the semiconductor devices, wherein at the time of the data transfer, the control circuit outputs a read-out request instruction, which requests read-out of the transfer data to the first buffer circuit, to the semiconductor device functioning as the transfer-source semiconductor device, the semiconductor device functioning as the transfer-source semiconductor device reads out the transfer data to the first buffer circuit in response to the read-out request instruction, and returns an acknowledge signal to the control circuit after completion of the read-out, and the control circuit acquires the right of use of the data bus in response to the acknowledge signal.

2. The device according to claim 1, wherein in a case where the first buffer circuit associated with the semiconductor device functioning as the transfer-source semiconductor device includes an empty area, the control circuit outputs the read-out request instruction to the semiconductor device.

3. The device according to claim 1, wherein in a case where the second buffer circuit associated with the semiconductor device functioning as the transfer-destination semiconductor device includes an empty area, the control circuit transfers the transfer data to the second buffer circuit.

4. A semiconductor integrated circuit device which includes a plurality of semiconductor devices, comprising:
   a first buffer circuit provided in association with each of the plurality of semiconductor devices, transfer data being read out from the associated semiconductor device into the first buffer circuit when the associated semiconductor device functions as a transfer-source semiconductor device;
   a second buffer circuit provided in association with each of the plurality of semiconductor devices, the transfer data being transferred and written in the second buffer circuit when the associated semiconductor device functions as a transfer-destination semiconductor device;
   a data bus which transmits the transfer data between the semiconductor devices; and
   a control circuit which acquires a right of use of the data bus when the transfer data is read out into the first buffer circuit, transfers the transfer data via the data bus to the second buffer circuit associated with the semiconductor device functioning as the transfer-destination semiconductor device, and disclaims the right of use of the data bus after the transfer of the transfer data is completed, the data in the first buffer circuit being transferred to the second buffer circuit according to a control by the control circuit regardless of the semiconductor devices,
   wherein at the time of the data transfer, the control circuit outputs a plurality of read-out request instructions, each of which request read-out of the transfer data to the first buffer circuit, to the semiconductor device functioning as the transfer-source semiconductor device,
   the semiconductor device functioning as the transfer-source semiconductor device reads out the transfer data to the first buffer circuit in response to the read-out request instruction, and returns an acknowledge signal to the control circuit after completion of the read-out,
   the control circuit acquires the right of use of the data bus in response to the acknowledge signal,
   the semiconductor device functioning as the transfer-source semiconductor device stores a plurality of the read-out request instructions, and
   the semiconductor device functioning as the transfer-source semiconductor device reads out the transfer data into the first buffer circuit in an order different from an order in which the read-out request instructions are received.

* * * * *